United States Patent
Mano et al.

[11] Patent Number: 5,881,034
[45] Date of Patent: Mar. 9, 1999

[54] APPARATUS FOR DRIVING OBJECTIVE LENS

[75] Inventors: Kiyoshi Mano, Kanagawa; Kenji Kaneko, Tokyo; Toshio Watanabe, Kanagawa, all of Japan

[73] Assignee: Sony Corporation, Japan

[21] Appl. No.: 912,652

[22] Filed: Aug. 18, 1997

[30] Foreign Application Priority Data

Aug. 20, 1996 [JP] Japan ................................ 8-237328
Sep. 19, 1996 [JP] Japan ................................ 8-269288

[51] Int. Cl.[6] ........................................... G11B 7/12
[52] U.S. Cl. .................... 369/44.14; 369/44.15; 369/44.32
[58] Field of Search ................ 369/44.14, 44.15, 369/44.16, 44.19, 44.21, 44.28, 44.32, 112

[56] References Cited

U.S. PATENT DOCUMENTS 5,303,080  4/1994  O'Brien et al. ............ 369/44.15 X

*Primary Examiner*—Muhammad N. Edun
*Attorney, Agent, or Firm*—Ronald P. Kananen

[57] ABSTRACT

An apparatus for driving an objective lens of an optical disk system for recording/reproducing data to/from a data plane of an optical disk by using light which can simply correct a deviation from an adequate angle between an optical axis of the objective lens and the optical disk is provided by constructing such that the center of gravity of an objective lens movable part is located on the optical axis of the objective lens and a height for anchoring suspensions to the movable part coincides almost with the center of gravity of the movable part.

20 Claims, 31 Drawing Sheets

ELASTICITY IN TRK DIRECTION

UNNECESSARY OPERATION OF BOBBIN IN TRACK DIRECTION IS CONTROLLED

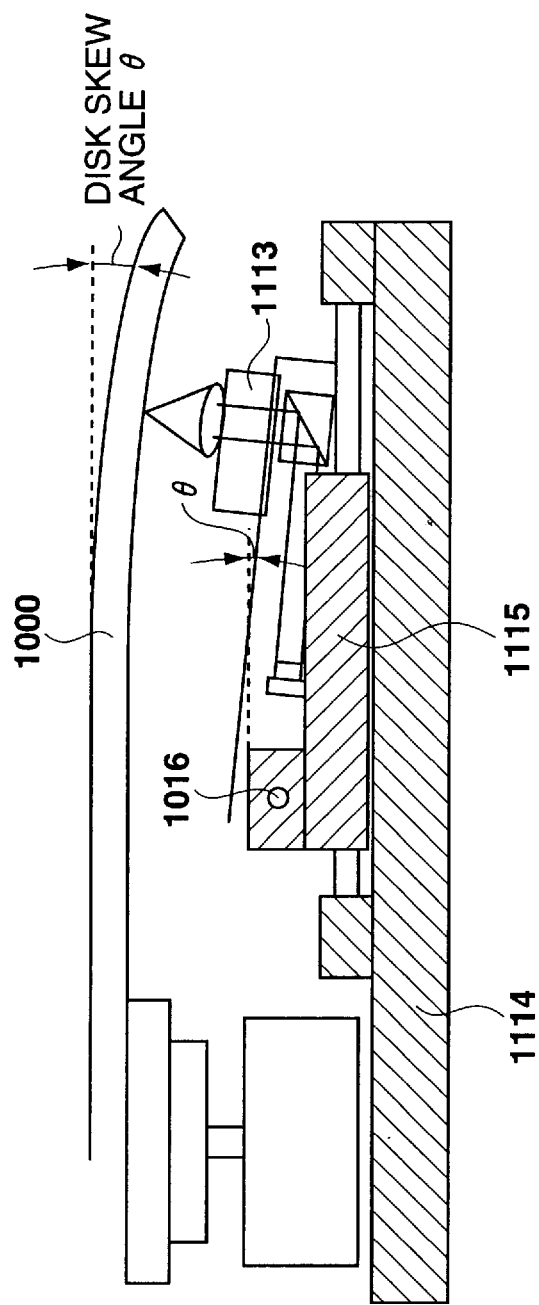

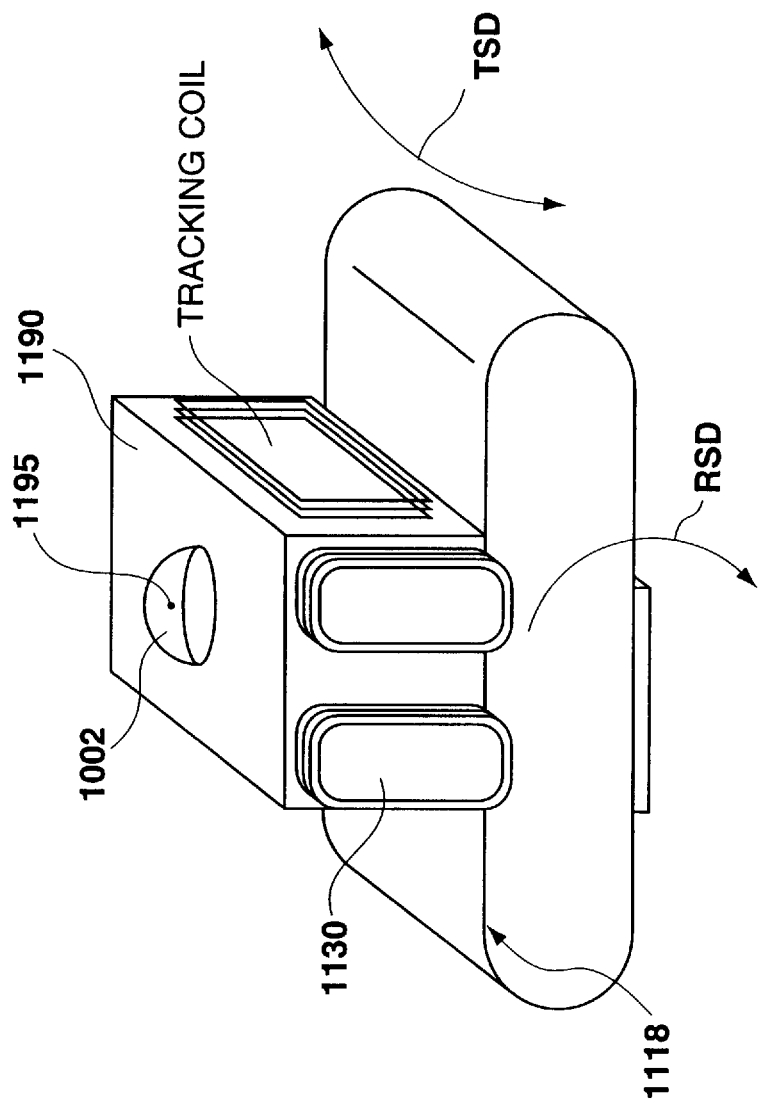

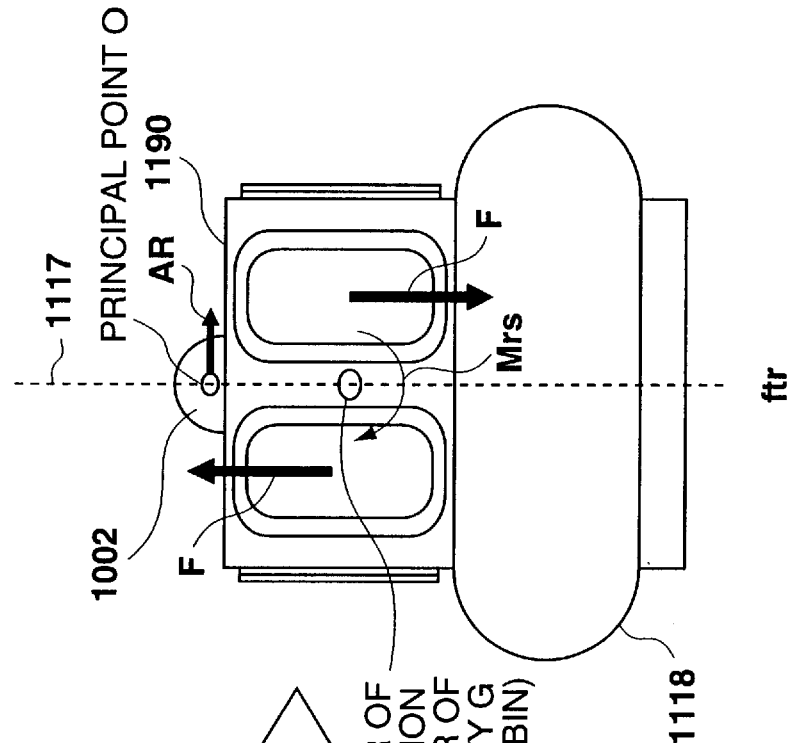
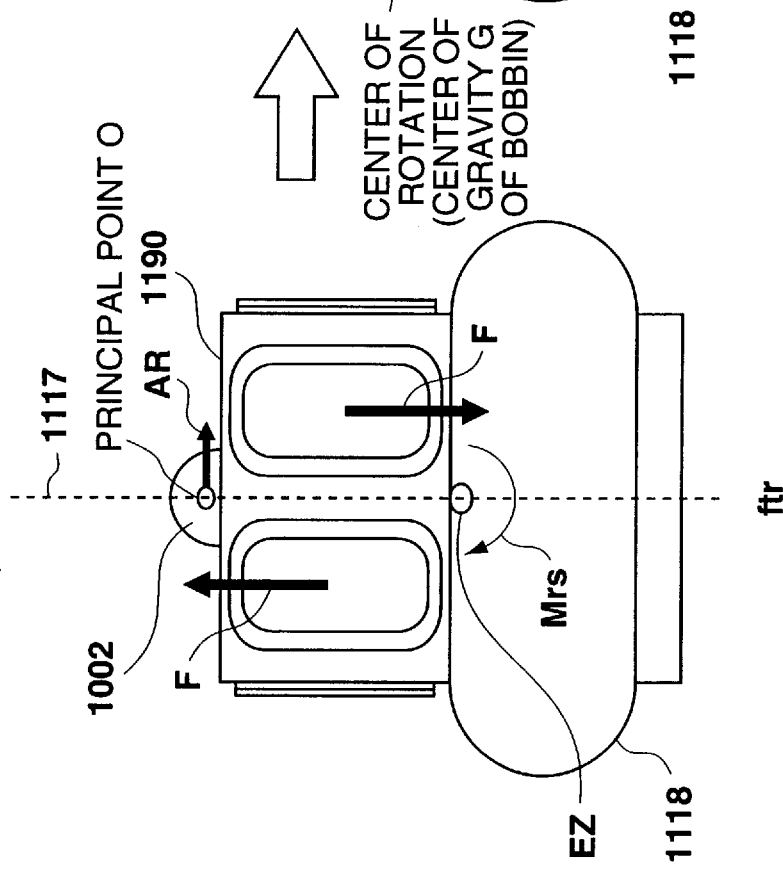

FIG. 31A
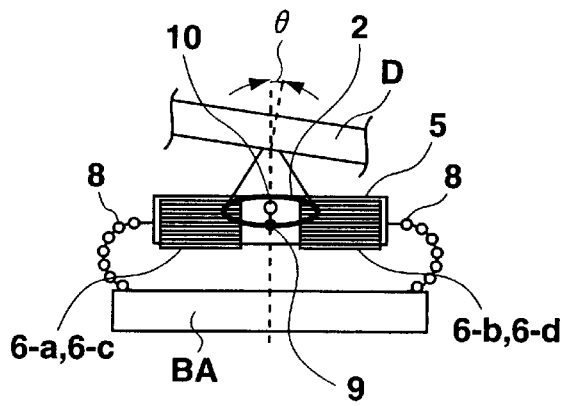
RADIAL SKEW SERVO IS OFF
RADIAL SKEW ERROR SIGNAL
= Ers ∝ θ
FIG. 31B
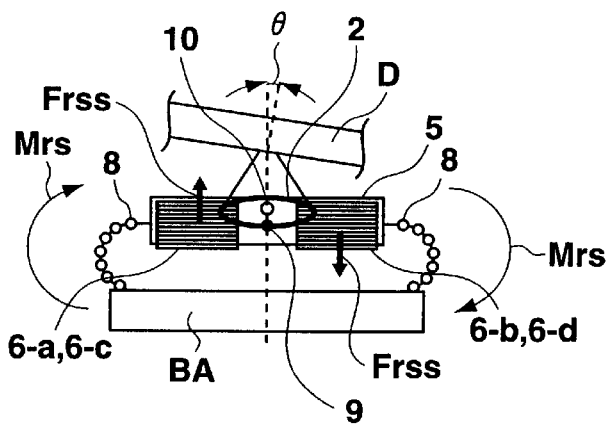
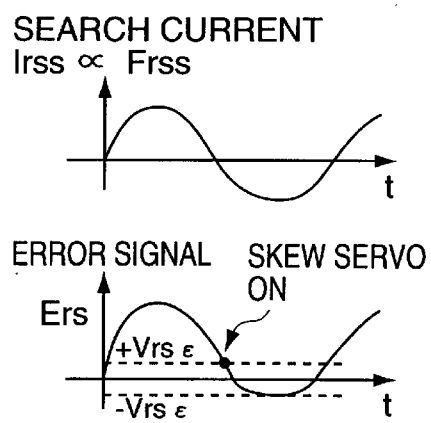
START RADIAL SKEW SEARCH
SEARCH CURRENT
Irss ∝ Frss
ERROR SIGNAL  SKEW SERVO ON
Ers
+Vrs ε
-Vrs ε
FIG. 31C
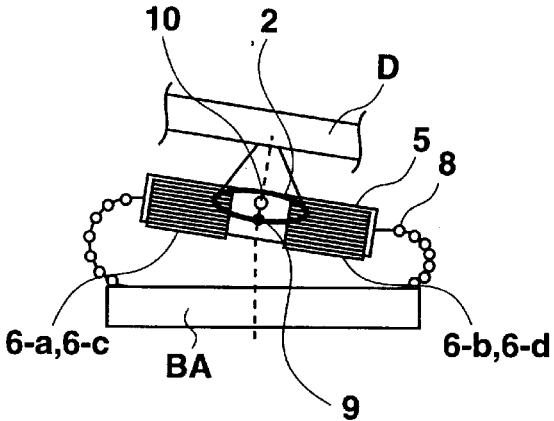
START RADIAL SKEW SEARCH

FIG. 33A
RADIAL SKEW SERVO IS OFF
RADIAL SKEW ERROR SIGNAL = Ers ∝ θ
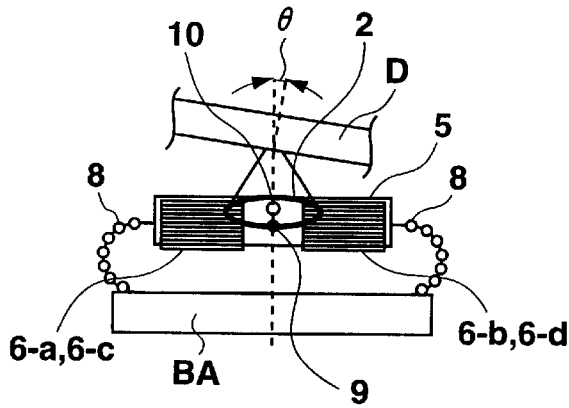
FIG. 33B
LOW LEVEL VALUE (GAIN) RADIAL SKEW SERVO ON AT Grs 1
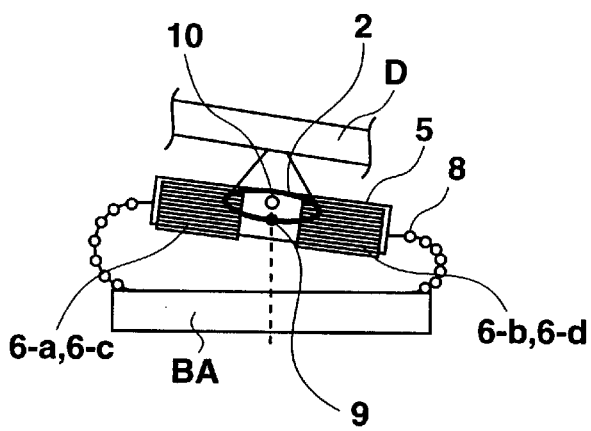
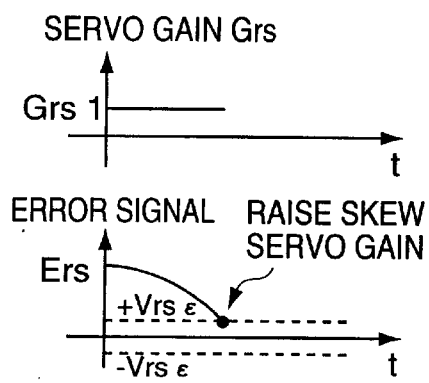
RAISE SKEW SERVO GAIN
FIG. 33C
CHANGE RADIAL SKEW SERVO GAIN FROM Grs 1 TO Grs 2
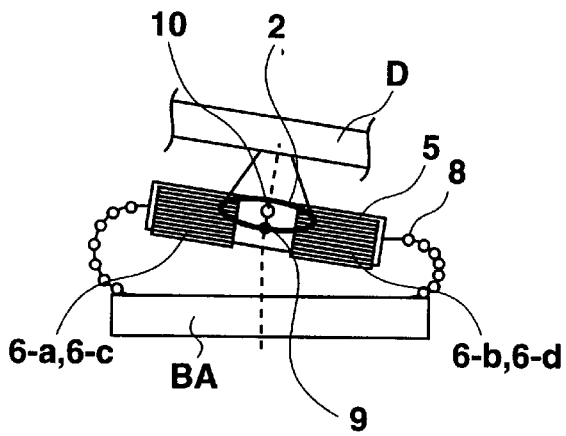
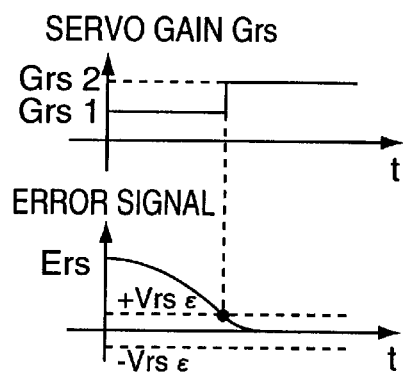

FIG. 35A
RADIAL SKEW SERVO IS OFF
RADIAL SKEW ERROR SIGNAL = Ers ∝ θ
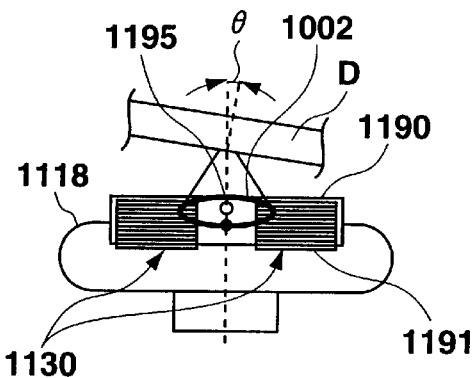
FIG. 35B
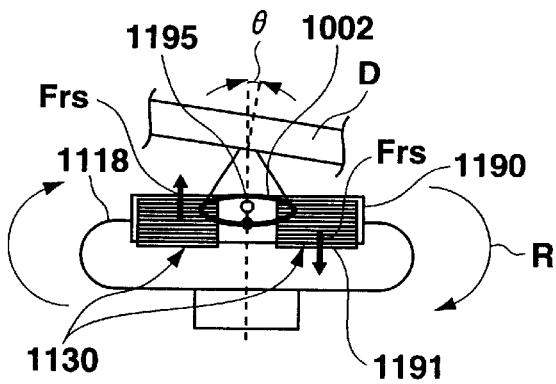
START RADIAL SKEW SERVO
DRIVE CURRENT Irs ∝ Frs
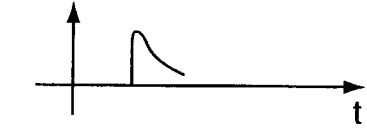
ERROR SIGNAL
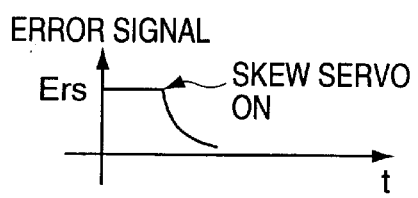
SKEW SERVO ON
FIG. 35C
TACKING SERVO IS OFF BECAUSE POSITION OF PRINCIPAL POINT OF OBJECTIVE LENS MOVES SUDDENLY BY ΔXrs
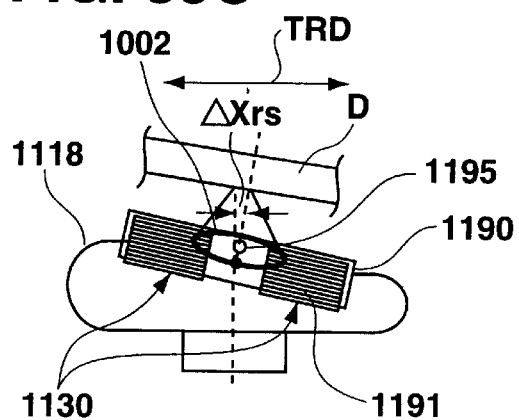

APPARATUS FOR DRIVING OBJECTIVE LENS

BACKGROUND OF THE INVENTION

The present invention relates to an apparatus for driving an objective lens for use in recording/reproducing information to/from a data plane of an optical disk by using light in an optical disk system.

In general, an optical disk system is optically designed so as to minimize aberration at a convergent spot when laser light output from an optical pickup and converged by an objective lens enters vertically to a disk plane. However, a phenomenon of angular aberration between the input beam and the disk plane (hereinafter referred to as a skew) occurs in recording/reproducing signals in an actual optical disk system due to the deflection of a shaft of a turn table during its rotation, the warpage of the optical disk itself and the like.

The higher the density of the signals to be recorded on the optical disk, the greater the adverse effect of the commatic aberration caused by the skew brought about in reading/writing the signals is, so that it is necessary to reduce the disk skew or to correct optically by any means in densifying the optical disk.

For the optical disk system so far, e.g. an optical disk system using a disk having a large diameter such as a laser disk which causes much disk skew, a mechanism as shown in FIG. 26 has been proposed. It is a system of inputting laser light vertically to a disk plane 1000 by rotating an optical pickup 1113 by an angle θ centering on an axis of rotation 1016 on a base 1115 of the optical pickup provided slidably on a mechanical deck 1114 when a disk skew angle θ is brought about.

However, this system consumes a large power because it is necessary to tilt the large optical pickup 1113 and it has been difficult to correct an AC component of the skew (timewise fluctuation caused by the warpage of the optical disk per each turn) synchronized with the rotation of the laser disk because it is not easy to tilt it at high speed.

With regard to such a problem, there has been proposed a method of tilting only an objective lens 1002 and a prism/mirror group not shown so that an optical axis of the objective lens 1002 is always vertical to a disk plane as shown in FIG. 27 (Japanese Patent Laid-Open No. Hei. 5-6555). This system requires less power in controlling the skew because a movable part 1190 comprises the objective lens 1002, a prism, a mirror and a case for holding them and allows the AC component of the disk skew to be corrected because it allows a fast operation.

However, in tilting the movable part 1190 to correct the skew, the movable part 1190 causes a momental force Mrs of rotational movement centering on an intersection of the optical axis 1117 and the anchoring height of a leaf spring 1118 as a center of rotation EZ as shown in FIG. 28A in a low frequency band (when lower than a primary resonance frequency ftr in the tracking direction).

In a high frequency band (when higher than the primary resonance frequency ftr in the tracking direction) on the other hand, it causes a momental force Mrs of rotational movement centering on of the center of gravity G of the movable part 1190 as shown in FIG. 28B. Therefore, when the movable part 1190 is tiled to correct a radial skew, the principal point O of the objective lens 1002 moves in the radial direction of the disk as indicated by an arrow AR in either cases of FIGS. 28A and 28B and the move of the principal point O turns out be disturbance to the tracking servo, so that it requires a tracking servo gain more than a normal case of using a biaxial actuator.

Further, because the movable part 1190 causes a momental force Mrs of rotational movement around the intersection EZ of the anchoring position of the leaf spring 1118 and the optical axis 1117 during a tracking operation in the low frequency band as shown in FIG. 29, it gives disturbance to the radial skew servo.

Accordingly, the radial skew servo and the tracking servo exert the disturbance on each other, causing the control to be unstable.

When the objective lens 1002 is tilted to correct the skew, the tilting operation for scrutinizing the skew may become disturbance to the focusing servo and tracking servo of the objective lens 1002 due to a reason of an assembly error in fabricating the apparatus for driving the objective lens or of size-wise requirement on the apparatus for driving the objective lens. FIGS. 35A through 35C show such disturbance for example.

Consider a case of starting an operation when the data recording plane of the optical disk D and the objective lens 1002 are far from an ideal relative angle in the prior art apparatus for driving the objective lens 1002 shown in FIG. 27, assuming that the principal point 1195 of the objective lens is located at the position higher than the center of gravity 1191 of the movable part 1190 as shown in FIGS. 35A through 35C. That is, when the objective lens 1002 is tilted in the radial skew direction RSD shown in FIGS. 27 and 35B with respect to the data recording plane of the optical disk D, a skew sensor mounted in the movable part 1190 detects an angle θ as a radial skew error signal Ers in many cases during the radial skew servo. FIGS. 35A and 35B show this angle θ.

In such a state, the radial skew servo is started as shown in FIG. 35B in order to reduce the relative angle between the objective lens 1002 and the data recording plane of the optical disk D. That is, the movable part 1190 causes the momental force Frs by feeding a drive current Irs to the focusing coils 1130.

Thereby, a backward thrust is applied to the movable part 1190 and the objective lens 1002 and the position of the principal point 1195 of the objective lens 1002 moves by ΔXrs as shown in FIG. 35C when driven in a low frequency. Accordingly, because the position of the principal point 1195 of the objective lens 1002 moves suddenly, disturbance is given to the tracking servo in the tracking direction TRD (radial direction of the optical disk D), thus causing a problem that the tracking servo is undone.

When a current which generates a backward thrust is supplied to the focusing coils 1130 in operating the tangential skew servo along the tangential skew direction TSD in FIG. 27 as shown in FIG. 36, the center of gravity of the movable part 1190 tilts centering on the center of tilt DC which is located on the left from the principal point 1195 of the objective lens 1002 when driven in a low frequency. Thereby, the principal point 1195 of the objective lens 1002 moves along the focusing direction FCS by ΔXts, thus giving disturbance to the focusing servo.

While the radial skew servo and the tangential skew servo of the objective lens 1002 act slightly as the disturbance on the focusing servo and the tracking servo as described above, there has been a problem that the focusing servo and the tracking servo are undone because a large disturbance is applied suddenly to the focusing servo and the tracking servo when the above-mentioned radial skew servo and the tangential skew servo operation are started in the state when the skew servo error signal which is output by the skew sensor is remarkably large, i.e. when the optical axis of the objective lens 1002 and the data recording plane of the optical disk D are far from being vertical each other.

Further, because the apparatus of Japanese Patent Laid-Open No. Hei. 5-6555 is provided with the light source and optical system for detecting a skew, beside a laser system for reading/writing signals, it hampers in providing a small and low cost pickup. Still more, there has been a problem that the driving sensitivity of the actuator drops because the movable part 1190 shown in FIG. 27 is supported by one cylindrical leaf spring 1118.

Because the movable part 1190 is supported by the thin leaf spring 1118, the leaf spring part may cause plastic deformation, damaging the performance of the actuator, when a strong shock is added from the outside.

Accordingly, it is an object of the present invention to provide an apparatus for driving the objective lens of an optical disk system which allows the deviation of the optical axis of the objective lens and the optical disk from an adequate angle therebetween to be easily corrected.

It is another object of the present invention to provide an apparatus for driving the objective lens of an optical disk system which allows data to be recorded/reproduced reliably on/from a high density optical disk by leading in a skew servo stably even when the skew servo is started in a state when the optical axis of the objective lens and the optical disk plane are far from being vertical each other.

SUMMARY OF THE INVENTION

According to the present invention, an apparatus for driving an objective lens of an optical disk system for recording/reproducing data to/from a data plane of an optical disk by using light comprises first driving means for permitting an objective lens movable part to move in the focusing direction and in the radial skew direction/tangential skew direction; second driving means for permitting the objective lens movable part to move in the tracking direction by crossing tracks of the optical disk; a fixing section; and suspensions for elastically holding the objective lens movable part to the fixing section; and is characterized in that the center of gravity of the objective lens movable part is located on an optical axis of an objective lens and the height for anchoring the suspensions to the objective lens movable part coincides almost with the height of the center of gravity of the objective lens.

Because the center of gravity of the objective lens movable part is located on the optical axis of the objective lens and the height for anchoring the suspensions to the objective lens movable part coincides almost with the height of the center of gravity of the objective lens in the present invention, it is possible to suppress the movable part from tilting in the radial skew direction to the minimum in operating the tracking servo with respect to disturbance in a frequency lower than a primary resonance frequency in the tracking direction.

The apparatus for driving the objective lens of the optical disk system is characterized in that a servo band in causing the second driving means to perform the tracking servo operation is set at a higher frequency than a servo band in causing the first driving means to perform the radial skew servo operation.

Because the servo band in causing the second driving means to perform the tracking servo operation is set at the frequency higher than the servo band in causing the first driving means to perform the radial skew servo operation in the present invention, unnecessary move of the movable part in the tracking direction caused by the radial skew servo may be absorbed by the operation of the movable part by the tracking servo.

According to another invention, an apparatus for driving an objective lens of an optical disk system for recording/reproducing data to/from a data plane of an optical disk by using light comprises first driving means for permitting an objective lens movable part to move in the focusing direction and in the radial skew direction/tangential skew direction; second driving means for permitting the objective lens movable part to move in the tracking direction by crossing tracks of the optical disk; a fixing section; and suspensions for elastically holding the objective lens movable part to the fixing section; and is characterized in that the center of gravity of the objective lens movable part is located on an optical axis of an objective lens and the height for anchoring the suspensions to the objective lens movable part coincides almost with the height of the rear side principal point of the objective lens.

Because the center of gravity of the objective lens movable part is located on the optical axis of the objective lens and the height for anchoring the suspensions to the objective lens movable part coincides almost with the height of the rear side principal point of the objective lens in the present invention, it is possible to suppress to the minimum an occurrence of disturbance to the tracking servo that the rear side principal point of the objective lens moves in the radial direction (tracking direction) of the disk with respect to disturbance in a frequency lower than the primary resonance frequency in the tracking direction.

According to a still other invention, an apparatus for driving an objective lens of an optical disk system for recording/reproducing data to/from a data plane of an optical disk by using light comprises first driving means for permitting an objective lens movable part to move in the focusing direction and in the radial skew direction/tangential skew direction; second driving means for permitting the objective lens movable part to move in the tracking direction by crossing tracks of the optical disk; a fixing section; and suspensions for elastically holding the objective lens movable part to the fixing section; and is characterized in that the center of gravity of the objective lens movable part is located on an optical axis of an objective lens, the center of gravity of the objective lens movable part coincides almost with the rear side position of the principal point of the objective lens and the height for anchoring the suspensions to the objective lens movable part coincides almost with the height of the center of gravity of the objective lens movable part and the height of the rear side principal point of the objective lens.

Because the center of gravity of the objective lens movable part is located on the optical axis of the objective lens, the center of gravity of the movable part coincides almost with the rear side principal point of the objective lens and the height for anchoring the suspensions to the objective lens movable part coincides almost with the height of the center of gravity of the objective lens movable part and the height of the rear side principal point of the objective lens in the invention, the objective lens may be operated stably in the directions of four degrees of freedom of focusing, tracking, radial skew and tangential skew while preventing mechanical interference thereof to the minimum.

In the inventive apparatus for driving the objective lens of the optical disk system, the objective lens movable part comprises skew sensors for detecting a relative inclination between the optical disk and the objective lens and the skew sensor comprises light emitting means for emitting light having a different wavelength from a wavelength of light used in a reading optical system for reading signals on data plane of an optical disk; an optical filter for transmitting the light emitted by the light emitting means and for blocking the light used in the reading optical system; and light receiving means for receiving the light emitted from the light emitting means and reflected on the data plane of the optical disk.

Because the optical filter of the skew sensor blocks the light of the reading optical system for reading signals on the data plane of the optical disk, though it transmits the light from the light emitting means of the skew sensor in the present invention, the skew sensor can detect the relative inclination between the optical disk and the objective lens reliably without being hampered by the light used in the reading optical system.

In the inventive apparatus for driving the objective lens of the optical disk system, the suspension is a plate-like member whose thickness is increased partially along the track direction of the optical disk.

Because the suspension is a plate-like member whose thickness is increased partially, it may be formed lightly as a whole. It also allows the rigidity in the track direction to be reinforced while supporting the movable part with the same degree of spring constant with the prior art in the direction of four degrees of freedom. From this fact, because the spring constant in the direction of four degrees of freedom may be lowered when the same degree of rigidity in the track direction is maintained in contrary, the driving sensitivity of the driving apparatus may be improved.

The inventive apparatus for driving the objective lens of the optical disk system further comprises restricting members for restricting the objective lens movable part from shifting excessively in the focusing direction/tracking direction.

Because the restricting members restrict the excessive dislocation of the objective lens movable part in the focusing and tracking directions in the present invention, the moves of the objective lens movable part in the direction vertical to the plane of the optical disk and in the direction parallel to the plane of the optical disk are restricted and it is possible to prevent damage such as plastic deformation of the suspension even if an external impingement is applied.

According to a further invention, an apparatus for driving an objective lens of an optical disk system for recording/reproducing data to/from a data plane of an optical disk by using light comprises first driving means for permitting an objective lens movable part to move in the focusing direction and in the radial skew direction/tangential skew direction; second driving means for permitting the objective lens movable part to move in the tracking direction by crossing tracks of the optical disk; a fixing section; suspensions for elastically holding the objective lens movable part to the fixing section; and skew sensors for detecting skew at least either in the radial skew direction or the tangential skew direction with respect to a relative angle between an objective lens and the data plane of the optical disk; and is characterized in that when a current is supplied to the first driving means and a value of a skew error signal output from the skew sensor becomes smaller than a preset level, a skew servo is started to tilt the objective lens with respect to the data plane of the optical disk to adjust the skew.

The skew servo is started when a current is supplied to the first driving means and a value of a skew error signal output from the skew sensor becomes smaller than a preset level in the present invention. Thereby, the skew servo will not affect the focusing servo operation for moving the objective lens to the focusing direction when the value of the skew error signal drops and settles and the tracking servo operation for moving the objective lens in the tracking direction in controlling the skew by tilting the objective lens with respect to the data plane of the optical disk.

According to a still other invention, an apparatus for driving an objective lens of an optical disk system for recording/reproducing data to/from a data plane of an optical disk by using light comprises a plurality of first driving means for moving an objective lens linearly in the focusing direction for tilting it at least either in the radial skew direction or the tangential skew direction in correspondence to a degree of skew which is a relative angle between an objective lens and a data plane of an optical disk; a plurality of second driving means for moving the objective lens movable part in the tracking direction by crossing tracks of the optical disk; a fixing section; suspensions for elastically holding the objective lens movable part to the fixing section; and skew sensors for detecting skew at least either in the radial skew direction or the tangential skew direction with respect to a relative angle between the objective lens and the data plane of the optical disk; and is characterized in that a servo gain of a skew servo is variable and the skew servo gain is set at a preset gain level within a certain time from a point of time when a value of a skew error signal output from the skew sensor becomes smaller than the preset level after starting the skew servo or the skew servo gain is set at a preset gain level within a certain time right after starting the skew servo.

The servo gain of the skew servo is variable and the skew servo gain is set at a preset gain level within a certain time from a point of time when a value of a skew error signal output from the skew sensor becomes smaller than the preset level after starting the skew servo or the skew servo gain is set at a preset gain level within a certain time right after starting the skew servo.

Thereby, the skew servo may be lead in stably without giving any adverse effect to the focusing servo operation and the tracking servo operation.

The specific nature of the invention, as well as other objects, uses and advantages thereof, will clearly appear from the following description and from the accompanying drawings.

BRIEF DESCRIPTION OF DRAWINGS

FIG. 26 is a diagram showing one example of a skew angle θ of a disk in a prior art optical disk;

FIG. 27 is a perspective view showing a objective lens, focusing coils, tracking coils, a leaf spring and others of the prior art example;

FIGS. 28A and 28B are diagrams showing a radial skew servo operation in the prior art example shown in FIG. 27;

FIGS. 31A through 31C are drawings for explaining the radial skew servo of the apparatus for driving the objective lens;

FIGS. 33A through 33C are drawings showing another exemplary operation of the apparatus for driving the objective lens;

FIGS. 35A through 35C are drawings showing an exemplary operation of the prior art example shown in FIG. 27.

DESCRIPTION OF PREFERRED EMBODIMENTS

Preferred embodiments of the present invention will be explained below in detail with reference to the accompanying drawings. It is noted that the following modes of the invention are merely preferable embodiments of the present invention, so that the scope of the invention will not be limited by those modes in the following explanation unless specified to that effect even though technologically preferable limitations are marked therein in various ways.

Figure 1:
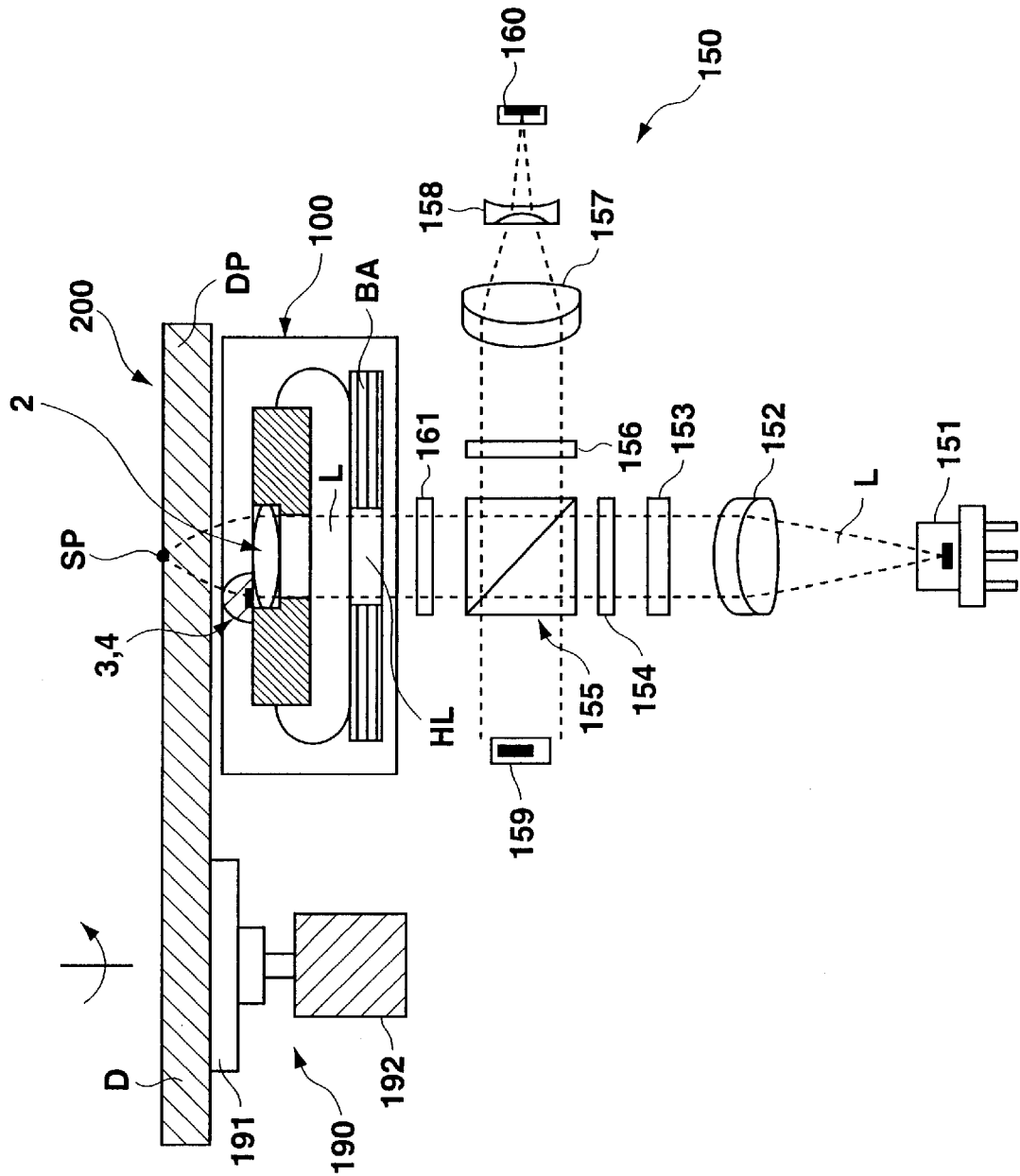
FIG. 1 is a diagram showing one example of an optical disk system including an inventive apparatus for driving an objective lens.

FIG. 1 shows one example of an optical disk system provided with an inventive apparatus for driving an objective lens. The optical disk system 200 in FIG. 1 comprises the objective lens driving apparatus 100, a reproducing optical system 150, a driving section 190 for driving an optical disk D, and others.

The driving section 190 comprises a chucking section 191 and a motor 192. The optical disk D may be removably mounted on the chucking section 191. The motor 192 can rotate the chucking section 191 and the optical disk D continuously.

The objective lens driving apparatus 100 is an apparatus for moving the objective lens 2 with respect to a disk plane DP of the optical disk D. The reproducing optical system 150 is disposed around the objective lens driving apparatus 100.

The reproducing optical system 150 is an optical system for reproducing data signals recorded on the disk plane DP of the optical disk D. The reproducing optical system 150 comprises a laser diode 151, a collimator lens 152, a grating 153, a λ/2 plate (half-wave plate) 154, a polarizing beam splitter 155, a λ/2 plate 156, a condenser lens 157, a cylindrical lens and a concave lens 158, a photo-detector 160 splitted into eight detectors, a front monitoring photo-detector 159, a λ/4 plate 161 and others.

The laser diode 151 emits laser light L having a wavelength of 650 nm for example. The laser light L is collimated by the collimator lens 152 and reaches the polarizing beam splitter 155 via the grating 153 and the λ/2 plate 154. The polarizing beam splitter 155 guides part of this laser light L to the front monitoring photo-detector 159 and the remaining part of the laser light L to the objective lens 2. The front monitoring photo-detector 159 is a detector for monitoring the output of the laser diode 151.

The objective lens 2 converges and irradiates the laser light L to the disk plane DP as a spot light. The return light from the disk plane DP is guided to the photo-detector 160 splitted into eight detectors by passing through the λ/4 plate 161, by reflecting on the polarizing beam splitter 155, by being condensed by the condenser lens 157 via the λ/2 plate 156 and by being condensed further by the cylindrical and concave lenses 158.

Figure 5:
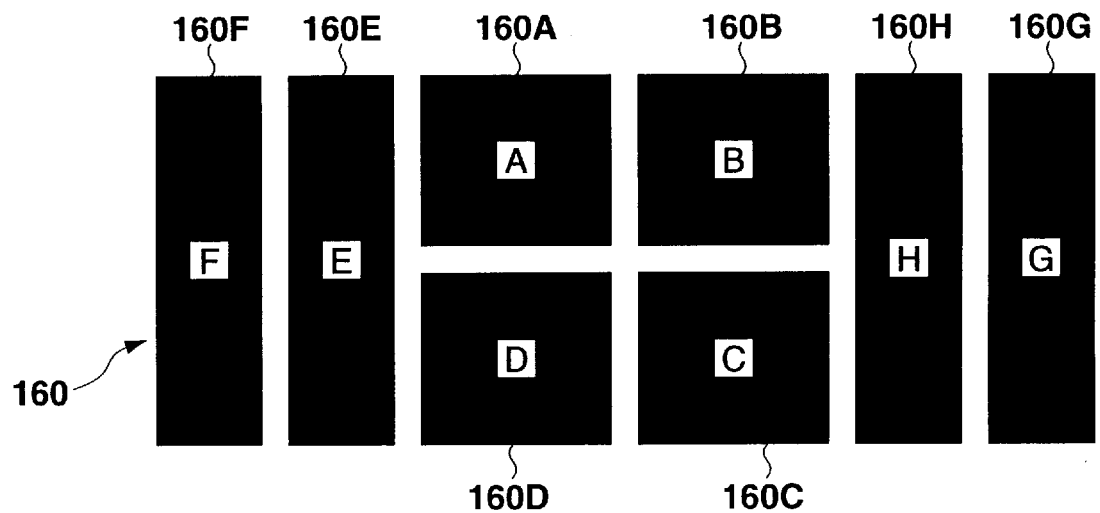
FIG. 5 is a diagram showing one example of a photo detector in the reproducing optical system shown in FIG. 1.

FIG. 5 shows an exemplary arrangement pattern of the photo-detector 160 splitted into eight detectors. The photo-detector 160 is composed of detectors 160A through 160H. The detectors 160A through 160D are square and the detectors 160E through 160H are rectangular.

Figure 2:
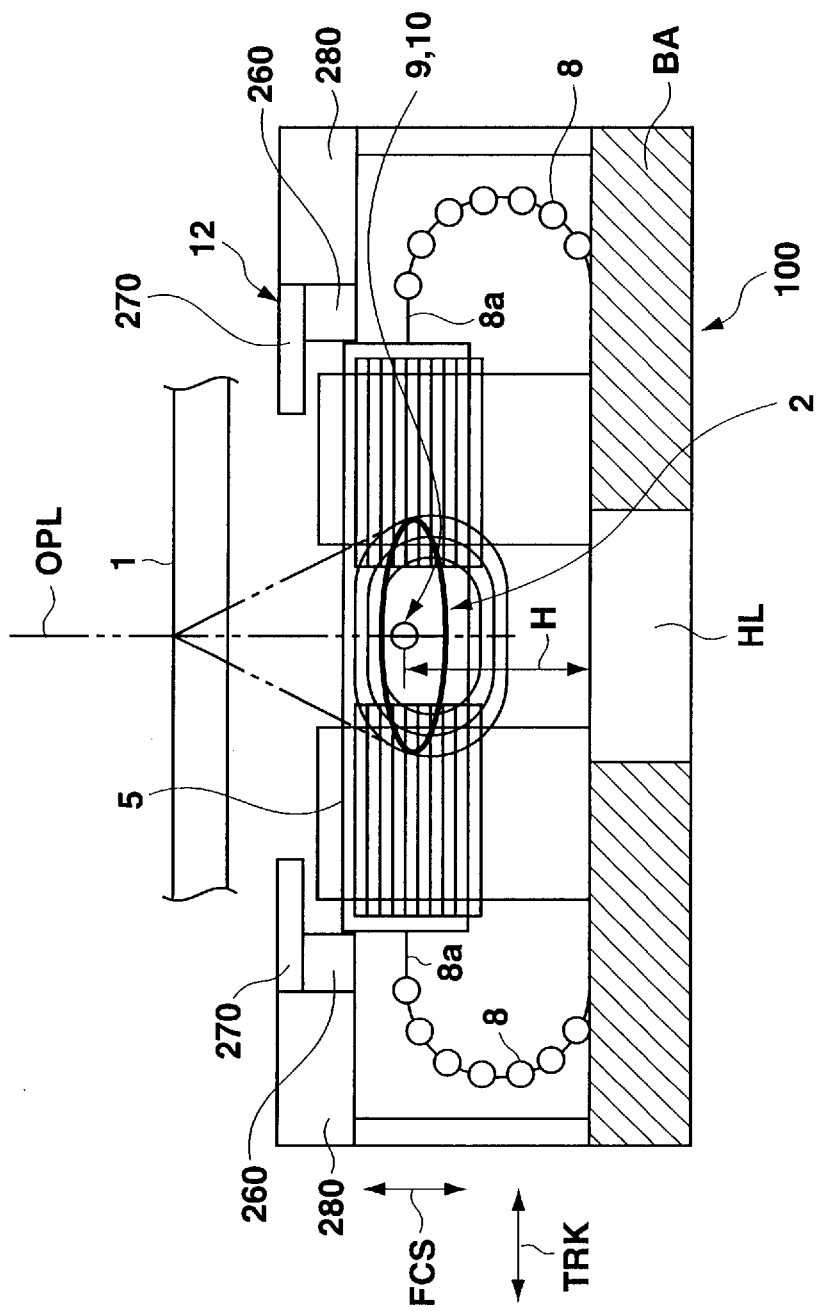
FIG. 2 is a side view showing one example of the apparatus for driving the objective lens of the optical disk system shown in FIG. 1.

The structure of the objective lens driving apparatus 100 shown in FIG. 1 will be explained below in detail with reference to FIGS. 2 and 3. FIG. 2 is a side view detailing further the structure of the objective lens driving apparatus 100 in FIG. 1 and FIG. 3 is a plan view of the objective lens driving apparatus 100.

The objective lens 2 is a lens for forming the spot SP of the laser light L in FIG. 1 on the disk plane DP. The objective lens driving apparatus 100 comprises the objective lens 2, a bobbin (movable part) 5, a plurality of focusing coils 6a, 6b, 6c, and 6d, tracking coils 7a and 7b, a base BA, four suspensions 8, a tangential skew sensor 3, a radial skew sensor 4 and others.

Figure 3:
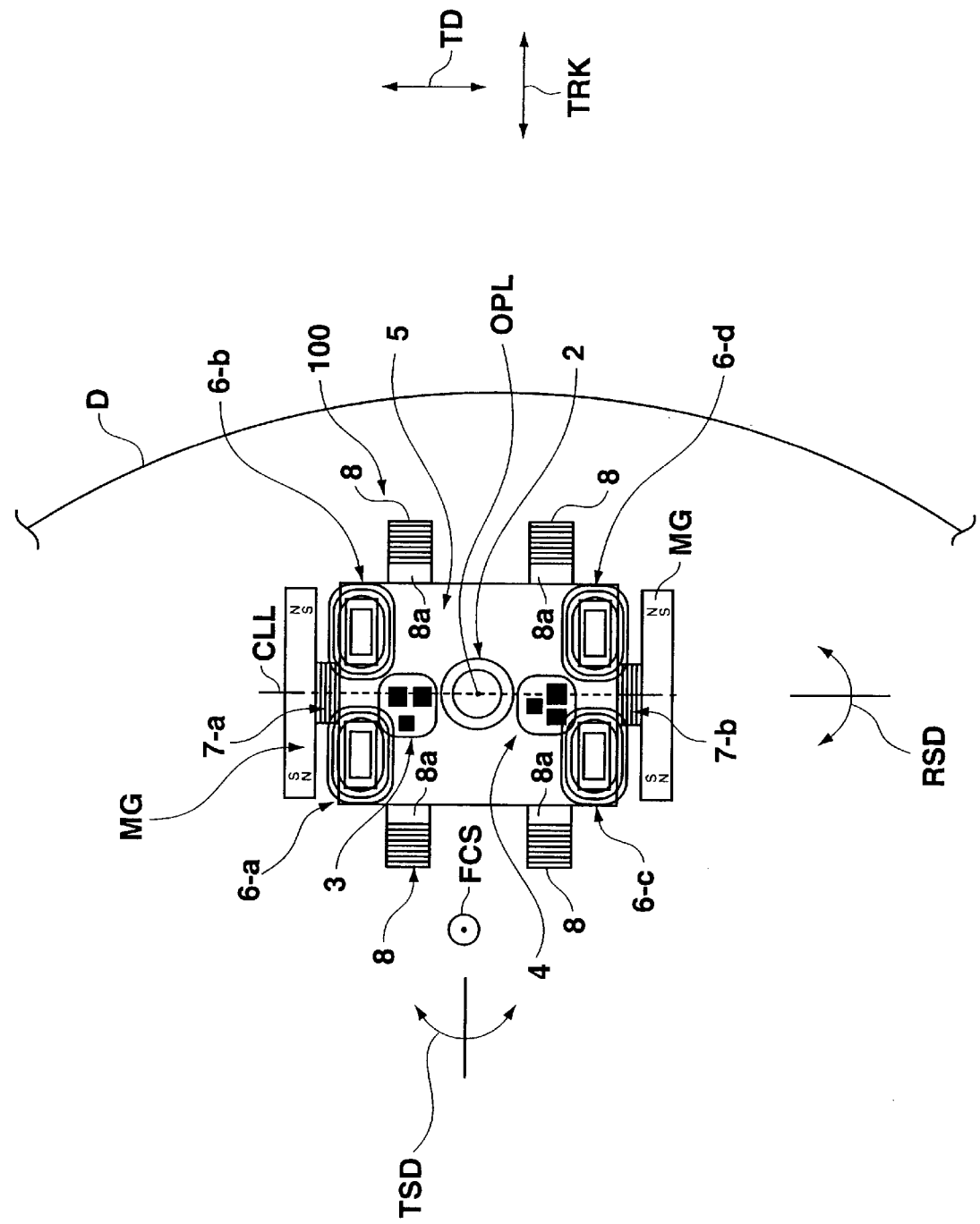
FIG. 3 is a plan view of the apparatus for driving the objective lens shown in FIG. 2.

The bobbin 5, i.e. the movable part, is made of plastics for example and has a rectangular shape as seen in FIG. 3. The objective lens 2 is mounted on the center of the bobbin 5 as seen in FIG. 3.

The tangential skew sensor 3 and the radial skew sensor 4 are provided nearly along the center axis CLL of the bobbin 5 in the plan view of FIG. 3, though they are positioned on the side of the focusing coils 6a and 6c more or less. The radial skew sensor 4 and the tangential skew sensor 3 detect a relative angle between the objective lens 2 and the disk plane DP of the optical disk D (see FIG. 1).

The four focusing coils 6a through 6d are disposed nearly at the four corners of the top of the bobbin 5 as shown in FIG. 3. These focusing coils 6a through 6d are driving coils for linearly moving the bobbin 5 and the objective lens 2 in the focusing direction FCS or for tilting the bobbin 5 and the objective lens 2 in the radial skew direction RSD and the tangential skew direction TSD.

The two tracking coils 7a and 7b are mounted on the side of the short sides of the bobbin 5, respectively. The tracking coils 7a and 7b are driving coils for moving the bobbin 5 and the objective lens 2 linearly in the tracking direction TRK.

The bobbin 5 is provided with the four suspensions 8 between the bobbin 5 and the base BA. What is characteristic with them is that the four suspensions 8 are disposed symmetrically about the optical axis OPL of the objective lens 2 on the bobbin 5 and that an anchoring section 8a at the upper part of the suspension 8 is set at the same height H with the principal point 10 of the objective lens 2, i.e. at the same height H with respect to the upper face of the base BA.

Figure 9:
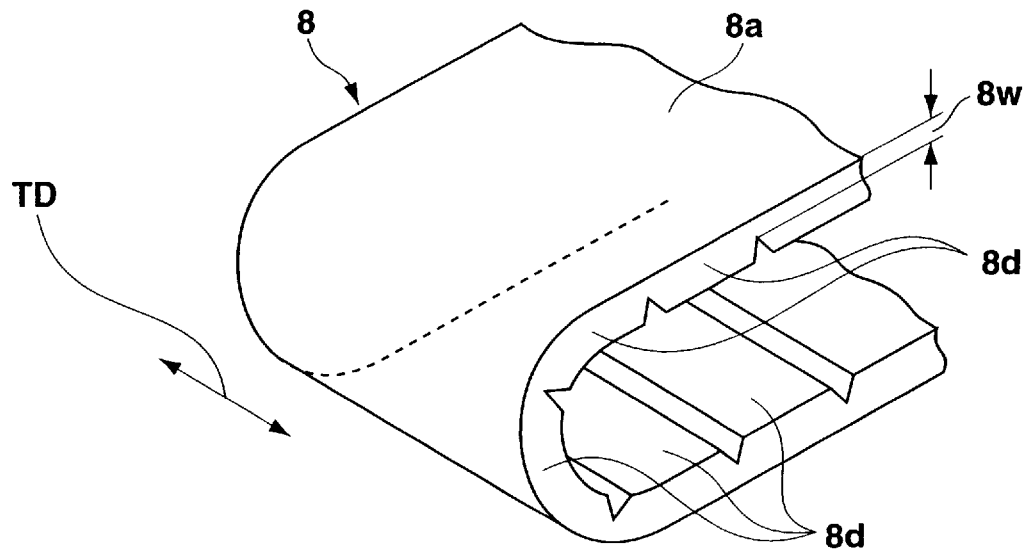
FIG. 9 is a perspective view showing one example of a suspension shown in FIG. 3.
Figure 10:
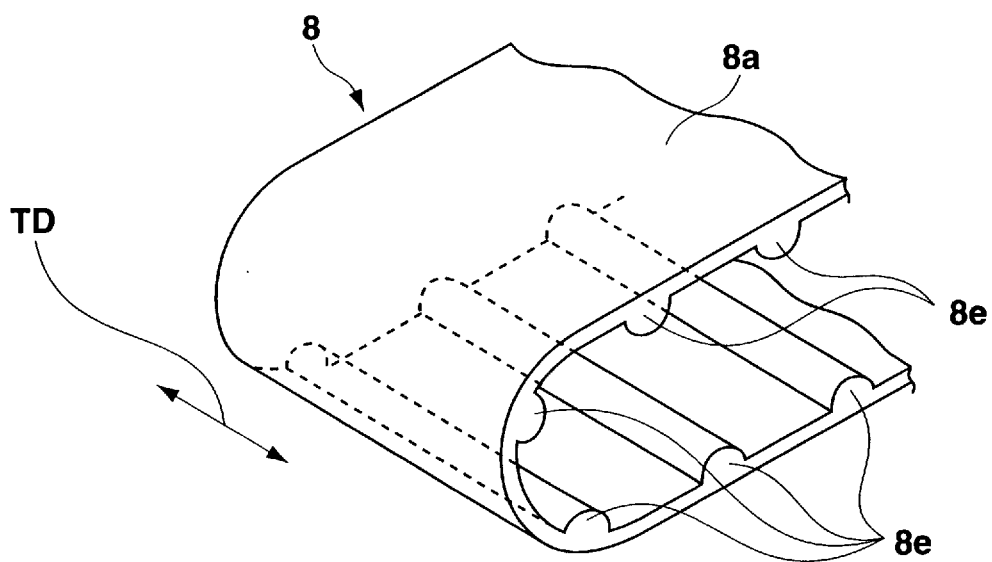
FIG. 10 is a perspective view showing another example of the suspension shown in FIG. 3.

FIGS. 9 and 10 show part of the suspension 8 which is made of thermoplastic elastomer which is excellent in elastic and mechanical characteristics and in bending strength (e.g. Hitrel manufactured by Toray Industries Inc.) or phosphor bronze and stainless steel which are high performance spring members having a good ductility. The suspension 8 shown in FIG. 9 is a plate-like member having a thickness 8W and thick parts 8d partially. The thick parts 8d are formed along the track direction TD (see FIG. 3) of the optical disk. It allows the bobbin 5 shown in FIGS. 2 and 3 to be held firmly to the base BA while maintaining the flexibility in moving the bobbin 5 in the focusing direction FCS and the tracking direction TRK or in the tangential skew direction TSD and the radial skew direction RSD.

The suspension 8 shown in FIG. 10 is also formed by bending a plate-like member and thick parts 8e are formed along the track direction TD. The thick parts 8e also act in the same manner with the thick parts 8d shown in FIG. 9. That is, the rigidity of the suspension 8 in the track direction TD may be increased by forming the thick parts 8d and 8e in the track direction TD as described above.

Figure 11:
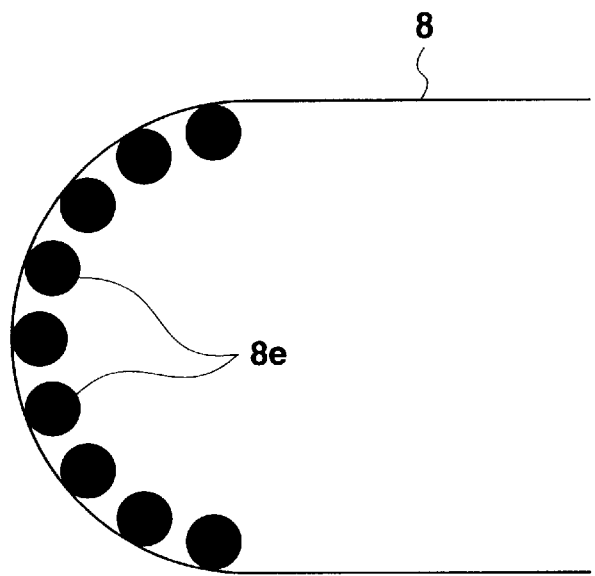
FIG. 11 is a diagram schematically showing the suspension shown in FIG. 10.
Figure 12:
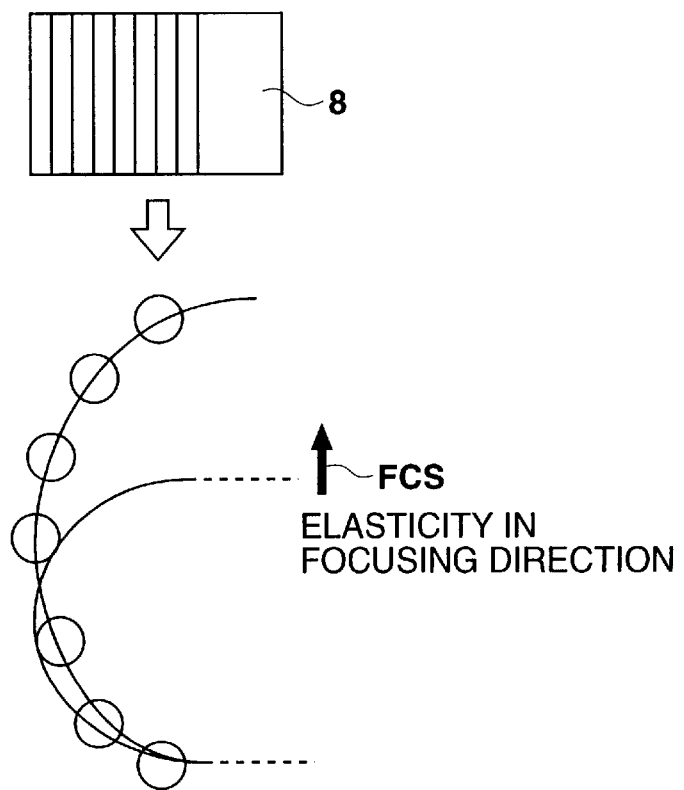
FIG. 12 is a diagram showing an example of operation of the suspension in the focusing direction.
Figure 13:
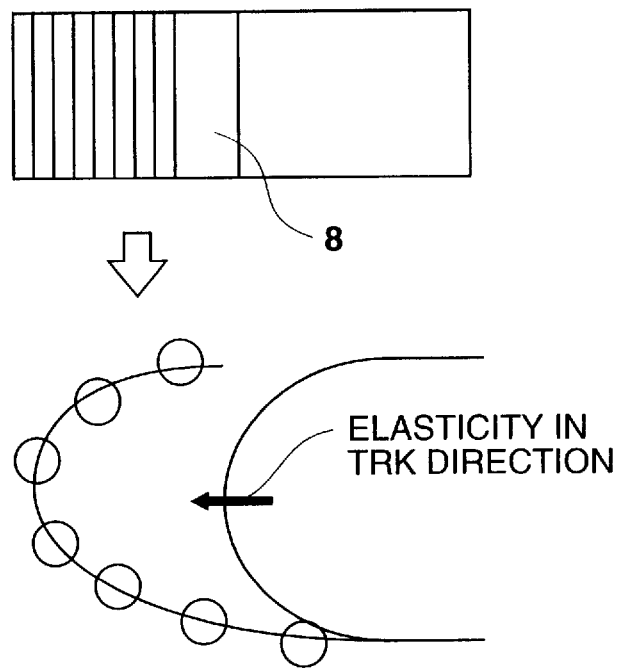
FIG. 13 is a diagram showing an example of operation of the suspension in the tracking direction.
Figure 14:
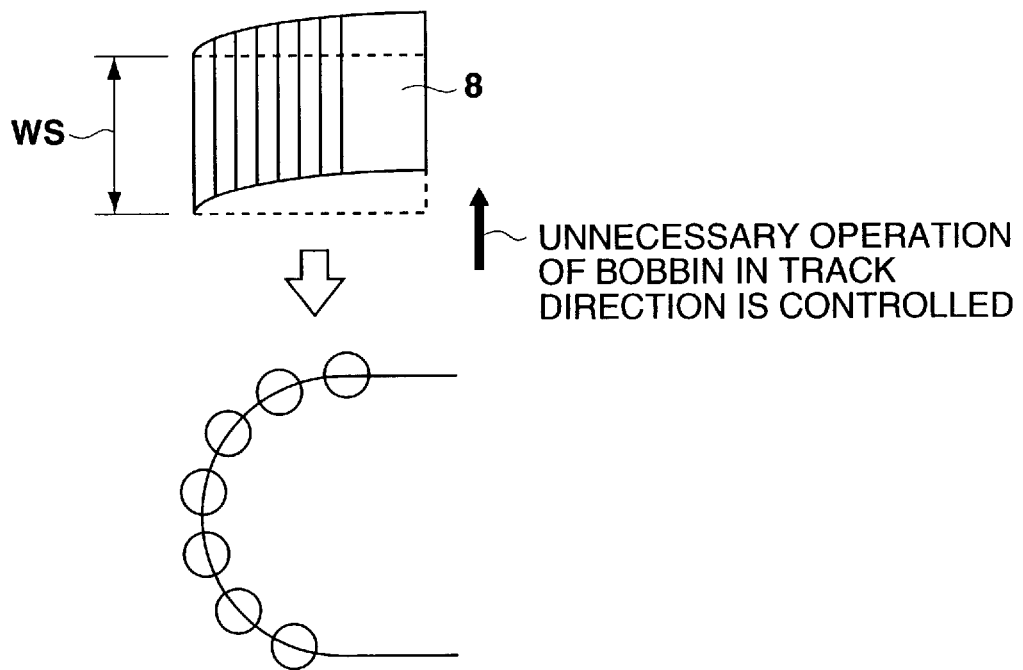
FIG. 14 is a diagram showing an operation of the suspension suppressing an unnecessary operation of a bobbin in the tracking direction.

FIG. 11 shows the suspension 8 in FIG. 10 diagrammatically. FIG. 12 shows a state in which the suspension 8 is elastically and flexibly deformed in the focusing direction FCS and FIG. 13 shows a state in which the suspension 8 is elastically deformed along the tracking direction TRK. FIG. 14 shows a state that the suspension 8 hardly deforms and is stable in the track direction TD owing to the fact that the thick parts 8e and 8e are formed along the track direction TD. That is, the suspension 8 functions such that the bobbin 5 shown in FIG. 3 will not move unnecessarily in the track direction TD.

The structure of the tangential skew sensor 3 and the radial skew sensor 4 shown in FIG. 3 will be explained below.

Assuming that a disk having a diameter of 120 mm (e.g. a compact disk or a disk in which two high-density disks are pasted) for example is used as the optical disk D in FIG. 3, the skew sensors 3 and 4 are disposed on the bobbin 5 so that the objective lens 2 and the two sensors 3 and 4 are positioned on the same track around 40 mm radially from the center of the optical disk D for example. That is, the skew sensor 3 and 4 are disposed on the bobbin 5 so that they are offset to the center of the optical disk D as compared to the objective lens 2.

Figure 6:
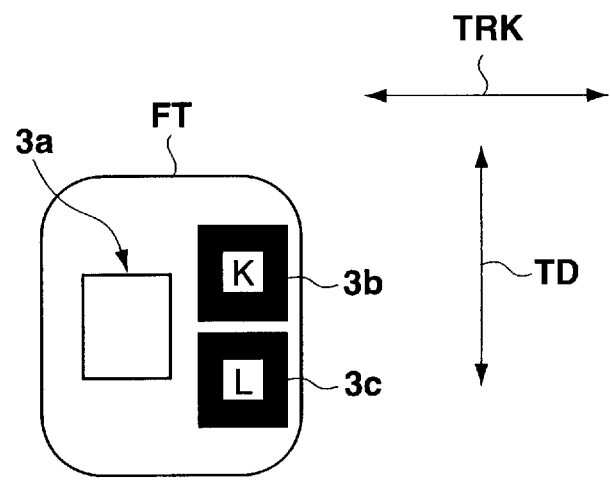
FIG. 6 is a diagram showing one example of a tangential skew sensor shown in FIG. 3.
Figure 7:
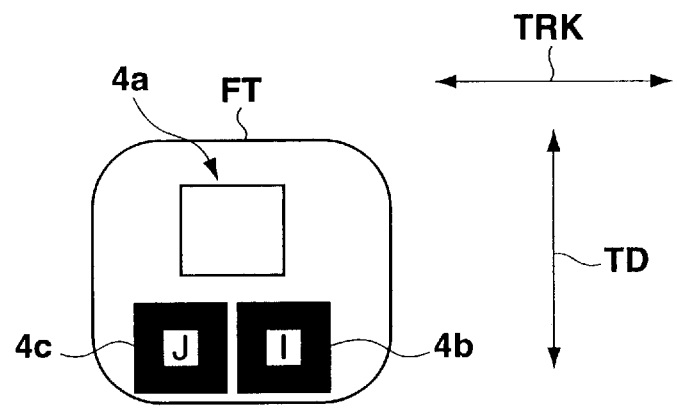
FIG. 7 is a diagram showing one example of a radial skew sensor shown in FIG. 3.

FIG. 6 shows an exemplary arrangement of the detectors of the tangential skew sensor 3 and FIG. 7 shows an exemplary arrangement of the detectors of the radial skew sensor 4.

Figure 8:
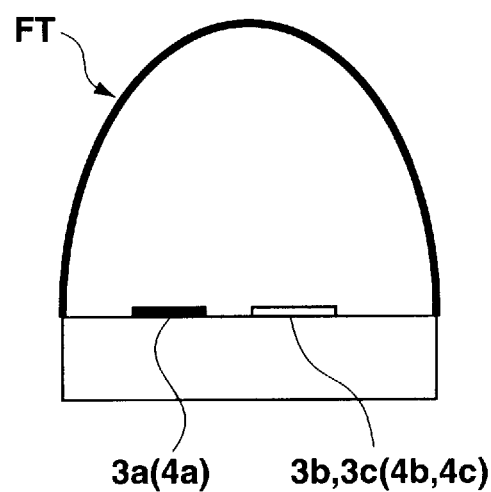
FIG. 8 is a diagram showing one example of an optical filter of the skew sensors in FIGS. 6 and 7.

In FIG. 6, the tangential skew sensor 3 has a LED (light emitting diode) 3a which is light generating means and two phototransistors 3b and 3c which are light receiving means. The LED 3a and the phototransistors 3b and 3c are covered by a lensed optical filter FT as shown in FIG. 8. The tangential skew sensor 3 detects the relative angle between the objective lens 2 and the disk plane DP of the optical disk D with respect to the tangential skew direction TSD as shown in FIG. 3.

The radial skew sensor 4 shown in FIG. 7 has a LED 4a which is light generating means and phototransistors 4b and 4c which are light receiving means. The LED 4a and the phototransistors 4b and 4c are also covered by a lensed optical filter FT as shown in FIG. 8. The radial skew sensor 4 detects the relative angle between the objective lens 2 and the disk plane DP of the optical disk D with respect to the radial skew direction RSD as shown in FIG. 3.

Although the lensed optical filter FT shown in FIG. 8 is made of plastics for example and transmits light generated by the LEDs 3a and 4a shown in FIGS. 6 and 7, it blocks laser light L generated by the laser diode 151 of the reproducing optical system 150. That is, although the lensed optical filter FT has a quality of blocking light having a wavelength of 650 nm from entering, it transmits light having a wavelength of 950 nm for example.

It is noted that magnets MG shown in FIG. 3 are all magnetized in the track direction TD and the adjoining magnets are magnetized in the opposite direction from each other.

When these magnets MG apply a magnetic field to first coils (focusing coils) and second coils (tracking coils) in the track direction TD, the first coils generate driving force in the direction vertical to the disk plane (focusing direction FCS) and the second coils generate driving force in the tracking direction during power-on state.

A hole HL is created at the middle part of the base BA shown in FIG. 2 to pass the laser light L coming from the polarizing beam splitter 155 and the return light from the disk plane DP to the side of the polarizing beam splitter 155 as shown in FIG. 1.

A driving circuit 300 comprising the photo-detector 160 splitted into eight detectors in FIG. 5, the tangential skew sensor 3 in FIG. 6, the radial skew sensor 4 in FIG. 7, the focusing coils 6a through 6d and the tracking coils 7a and 7b in FIG. 1 will be explained below with reference to FIG. 4.

Figure 4:
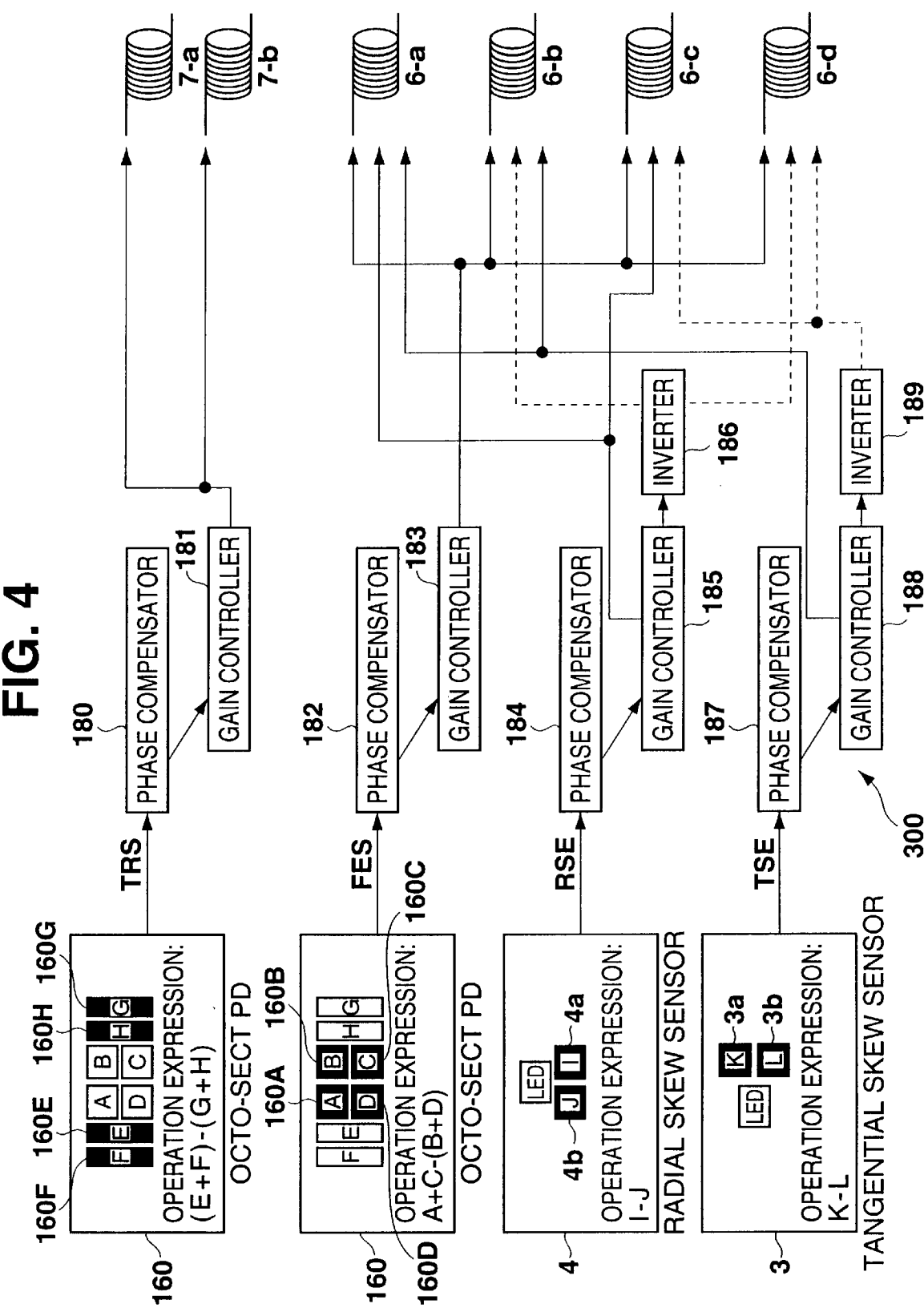
FIG. 4 is a diagram showing an example of a driving circuit of a focusing coil and a tracking coil in FIGS. 2 and 3.

FIG. 4 shows the connection of the photo-detector 160, the radial skew sensor 4, the tangential skew sensor 3, the four focusing coils 6a through 6d and the two tracking coils 7a and 7b in the driving circuit 300.

In FIG. 4, the photo-detectors 160E through 160H are connected to the two tracking coils 7a and 7b via a phase compensator 180 and a gain controller 181. The photo-detectors 160A through 160D are connected to the four focusing coils 6a through 6d via a phase compensator 182 and a gain controller 183.

The radial skew sensor 4 is connected to the two focusing coils 6b and 6d via a phase compensator 184, a gain controller 185 and an inverter 186. The radial skew sensor 4 is connected also to the two focusing coils 6a and 6c via the phase compensator 184 and the gain controller 185.

The tangential skew sensor 3 is connected to the two focusing coils 6b and 6d via a phase compensator 187, a gain controller 188 and an inverter 189. The tangential skew sensor 3 is connected also to the two focusing coils 6a and 6c via the phase compensator 187 and the gain controller 188.

In the reproducing optical system 150 shown in FIG. 1, the photo-detector 160 receives the return light from the disk plane DP. Then, a focusing error signal FES sent from the detectors 160A through 160D in FIG. 4 is phase-compensated by the phase compensator 182 and its gain is controlled by the gain controller 183. After that, a driving current having the same phase is sent to each of the four focusing coils 6a through 6d.

The detectors 160E through 160H send a tracking error signal TRS to the phase compensator 180. The tracking error signal TRS is phase-compensated by the phase compensator 180 and its gain is controlled by the gain controller 181. Then, a driving current having the same phase is sent to the two tracking coils 7a and 7b from the gain controller 181.

A radial skew error signal RSE obtained from the radial skew sensor 4 is sent to the phase compensator 184 to be phase-compensated and its gain is controlled by the gain controller 185. Then, a driving current having the same phase is sent from the gain controller 185 to the two focusing coils 6a and 6c and a driving current having an opposite phase is sent to the remaining two focusing coils 6b and 6d.

A tangential skew error signal TSE obtained from the tangential skew sensor 3 in FIG. 4 is phase-compensated by the phase compensator 187 and its gain is controlled by the gain controller 188. Then, a driving current having the same phase is sent from the gain controller 188 to the two focusing coils 6a and 6b and a driving current having an opposite phase is sent to the remaining two focusing coils 6c and 6d.

In operational examples of the suspension 8 shown in FIGS. 12 through 14, the suspension 8 can suppress the motion of the bobbin 5 (see FIG. 3) in the track direction TD as shown in FIG. 14 without loosing the elasticity in the focusing direction FCS and the tracking direction TRK in FIGS. 12 and 13. In other words, because the width WS of the suspension 8 may be reduced when the same degree of stability in the track direction TD is to be maintained, the sensitivity of the actuator may be improved when the focusing coils and the tracking coils of the bobbin 5 act as the actuator.

Side stoppers 260 and upper stoppers 270 are provided as external impingement protecting stoppers 12 at the upper part 280 of the base BA as shown in FIG. 2. The side stoppers 260 mechanically stop the bobbin 5 from being dislocated excessively along the tracking direction TRK. The upper stoppers 270 mechanically prevents the bobbin 5 from being dislocated excessively to the side of the disk plane 1 along the focusing direction FCS.

The upper stoppers 270 and the side stoppers 260 provided as described above play a role of preventing the bobbin 5 from being dislocated excessively in the tracking direction TRK or the focusing direction FCS and the suspension 8 from being plastically deformed when an impingement is applied from the outside.

Figure 15:
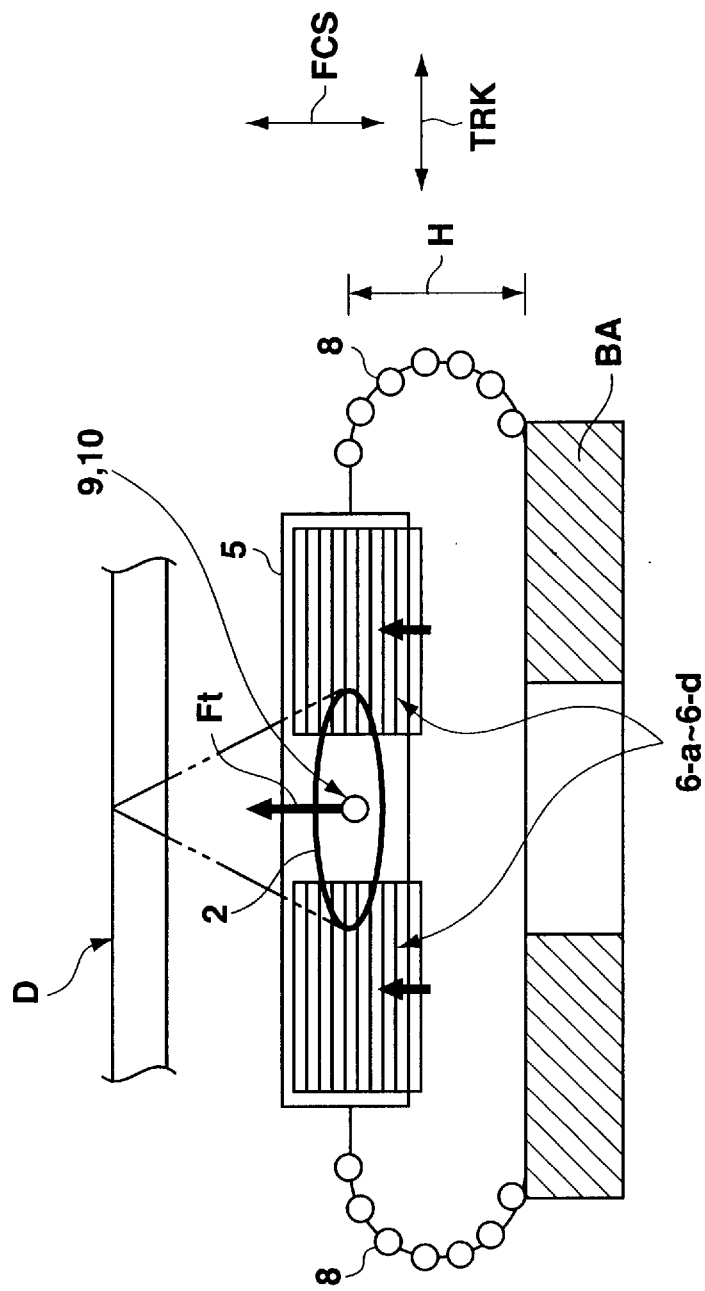
FIG. 15 is a diagram showing a case when the center of gravity of the bobbin, a principal point of the lens and a height for anchoring the suspension coincide and an operation state of focusing servo.

A focusing servo operation and a radial skew servo operation in the objective lens driving apparatus 100 will be explained below with reference to FIGS. 15 and 16. Although FIG. 15 shows the apparatus by simplifying that shown in FIG. 2, the state of the bobbin 5 shown in FIG. 15 is the same with that shown in FIG. 2 and the center of gravity 9 of the bobbin 5, the principal point 10 of the objective lens 2 and the anchoring height H of the suspension 8 almost coincide. Further, the four suspensions 8 for elastically supporting the focusing coils 6a through 6d and the bobbin 5 are symmetrical about the optical axis (the optical axis OPL shown in FIG. 3) of the objective lens 2.

From these points, when the driving current having the same phase for the focusing servo is applied to each of the focusing coils 6a through 6d shown in FIG. 4, the bobbin 5 is driven only in the focusing direction FCS (the direction approaching/separating to/from the disk plane DP in FIG. 1, or the direction vertical to the disk plane DP) without disturbing its position by no means. That is, because the four suspensions 8 and the four focusing coils 6a through 6d are point-symmetrical about the principal point 10 of the objective lens 2, the bobbin 5 will not cause rolling (swing in the tracking direction TRK or the track direction TD) and the objective lens 2 can perform the focusing servo operation.

Meanwhile, even when a tracking servo current having the same phase is applied to the tracking coils 7a and 7b shown in FIG. 4, the bobbin 5 can move linearly in the tracking direction TRK (radial direction) in FIG. 3 without disturbing its position.

When the radial skew servo is applied to the bobbin 5 and the objective lens 2, the resultant force of driving forces causes only momental force Mrs which is centered on the position of the center of gravity 9 of the bobbin 5 because the position of the principal point 10 of the objective lens 2, the center of gravity 9 of the bobbin 5 and the height H of the suspension 8 almost coincide. That is, when a radial skew servo current is applied to the four focusing coils 6a through 6d based on the radial skew error signal RSE shown in FIG. 4, the bobbin 5 will by no means move linearly and is tilted only in the radial skew direction RSD shown in FIGS. 3 and 16.

It is the same also when the tangential skew servo is applied to the bobbin 5 and the objective lens 2. That is, because the position of the principal point 10 of the objective lens 2, the center of gravity 9 of the bobbin 5 and the height H of the suspension 8 almost coincide and the resultant force of driving forces turns out to be only momental force which is centered on the position of the center of gravity 9, the bobbin 5 will by no means move linearly and is tilted only in the tangential skew direction TSD shown in FIGS. 3 when a tangential skew servo current is applied to the focusing coils 6a through 6d.

Figure 16:
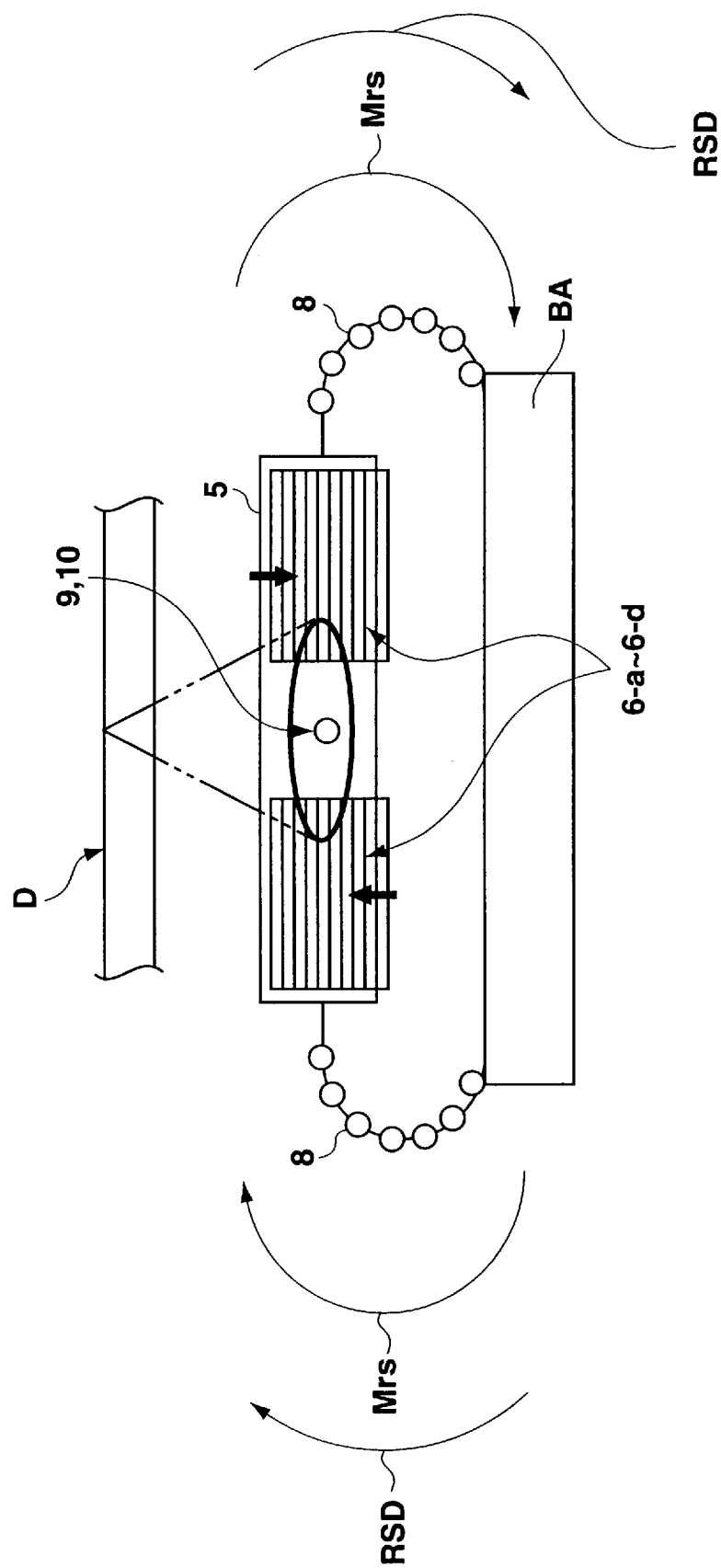
FIG. 16 is a diagram showing a case when the center of gravity of the bobbin, the principal point of the lens and the height for anchoring the suspension coincide and an operation state of radial skew servo.

When the radial skew servo is applied to the objective lens 2 as described above, the radial skew servo current having the same phase is applied to the focusing coils 6a and 6c and the radial skew servo current having the opposite phase is applied to the remaining two focusing coils 6b and 6d based on the radial skew error signal RSE shown in FIG. 4, so that the bobbin 5 tilts only in the radial skew direction RSD as shown in FIG. 16.

When the tangential skew servo is applied to the objective lens 2 on the other hand, the tangential skew servo current having the same phase is applied to the focusing coils 6a and 6b and the tangential skew servo current having the opposite phase is applied to the remaining two focusing coils 6c and 6d based on the tangential skew error signal TSE shown in FIG. 4, so that the bobbin 5 tilts only in the tangential skew direction TSD shown in FIG. 3.

The objective lens 2 and the bobbin 5 may be tilted in the radial skew direction RSD shown in FIG. 16 or in the tangential skew direction TSD shown in FIG. 3 in correspondence to the degree of skew of the optical disk D. Accordingly, the comatic aberration of the objective lens 2 may be canceled.

Further, because the four suspensions 8 are constructed as shown in FIGS. 9 and 10, the bobbin 5 and the objective lens 2 may be suppressed from moving unnecessarily in the track direction TD and the stable focusing and tracking servos as well as the radial skew and the tangential skew servos may be realized by one actuator.

Therefore, the deviation of the optical axis OPL of the objective lens 2 of the optical pickup and the optical disk D from the adequate angle caused by the subtle accuracy of the mechanism, the warpage of the optical disk, i.e. a recording medium, and the like may be readily corrected.

Then, the mechanical interference between four degrees of freedom in total of the focusing, tracking, radial skew and tangential skew directions may be minimized and the focusing servo, tracking servo, radial skew servo and tangential skew servo may be operated stably and independently from each other. The skew which is an angular deviation of the disk plane DP and the optical axis OPL of the objective lens 2 shown in FIG. 3 may be detected accurately even with such a simple structure.

Because the rigidity of the suspension 8 with respect to the track direction TD may be increased by adopting the structure of the suspension 8 shown in FIGS. 9 and 10, the width of the suspension 8 in the track direction TD may be reduced. The reduction of the width allows the stability of the bobbin 5 in the track direction TD to be assured and the driving sensitivity of the focusing coils and the tracking coils, i.e. the actuator, to be improved.

The center of gravity 9 of the bobbin 5 coincides almost with the position of the rear side principal point 10 of the objective lens 2 as shown in FIGS. 2 and 15 and the height H of the anchoring section 8a of the suspension 8 coincides almost with the center of gravity 9 and the principal point 10 in the embodiment described above.

Figure 17:
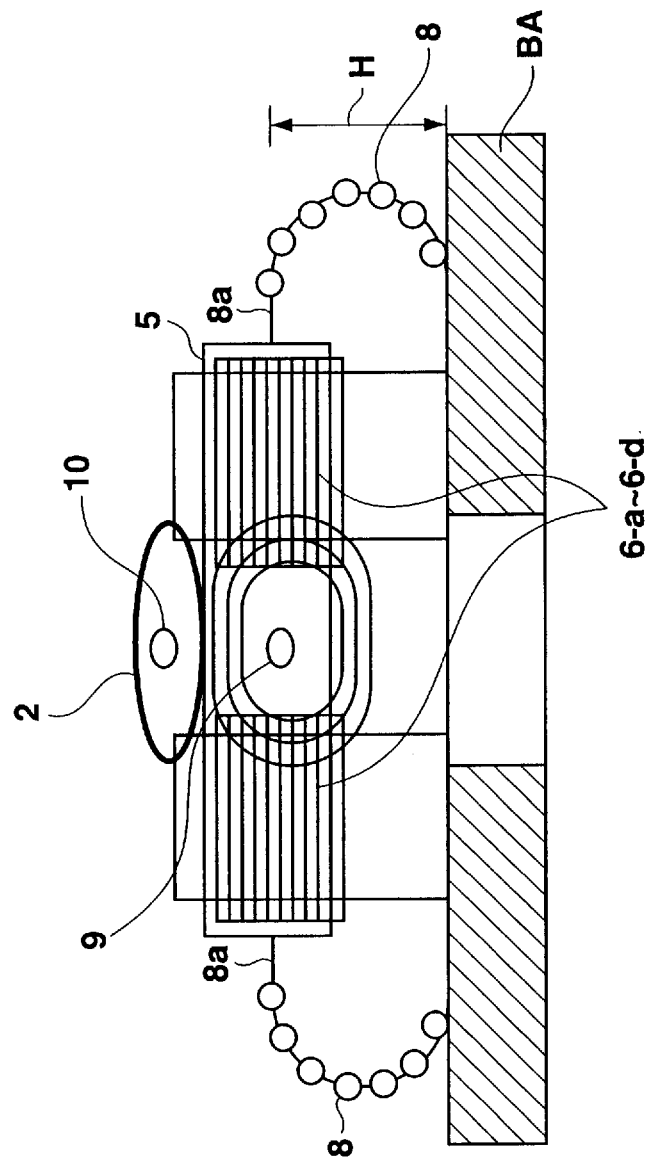
FIG. 17 is a diagram showing a case in which the height for anchoring the suspension coincides almost with the gravity of the bobbin and the principal point of the lens is positioned thereon.

FIG. 17 shows another embodiment in which the principal point 10 of the objective lens 2 is located at the position higher than the center of gravity 9 of the bobbin 5 and the height H of the suspension 8, though the height H of the anchoring section 8a of the suspension 8 coincides almost with the center of gravity 9 of the bobbin 5. Each component shown in FIG. 17 are the same substantially with each component explained with reference to FIGS. 1 through 16, so that their explanation will be omitted here.

The structure shown in FIGS. 3 or 15, i.e. the structure in which three elements of the principal point 10 of the objective lens 2, the center of gravity 9 of the bobbin 5 and the height H of the anchoring section 8a of the suspension 8 almost coincide or totally coincide, is ideal as the structure of the optical pickup.

However, in reality, the working distance of the objective lens 2 of the optical pickup used in the optical disk system is around 1 to 1.5 mm, so that the bobbin 5 itself, including the skew sensors 3 and 4, the objective lens 2 and others, needs to be miniaturized considerably in order to make the center of gravity 9 of the bobbin 5 totally coincide with the principal point 10 of the objective lens 2.

Figure 18:
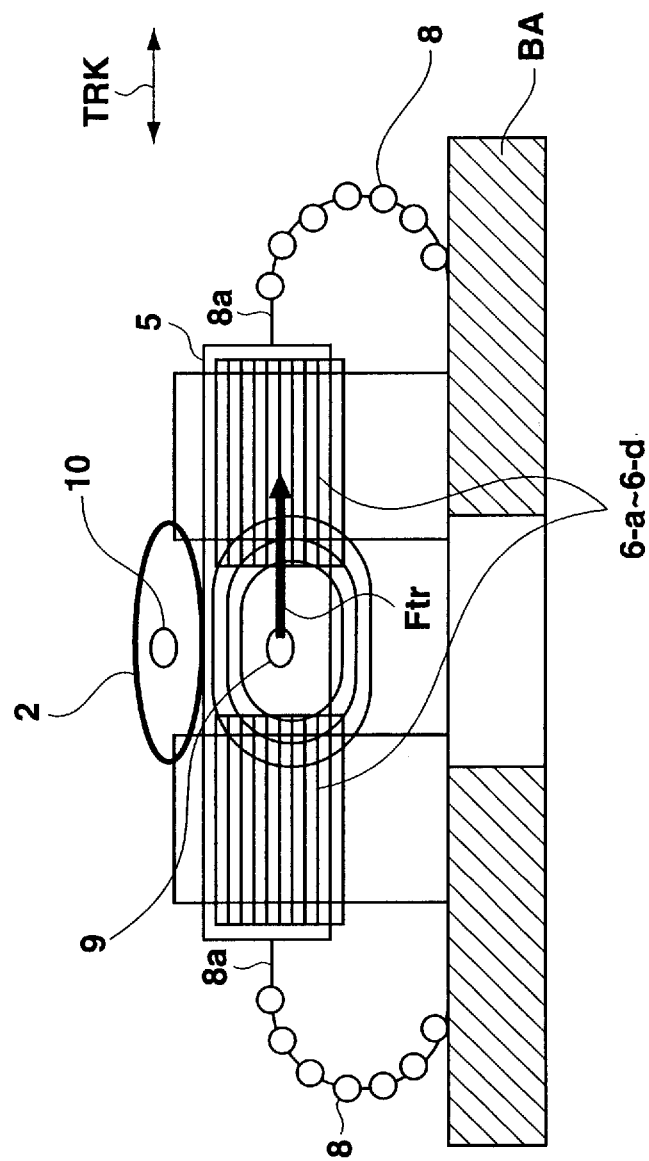
FIG. 18 is a diagram showing an example of operation of tracking servo in the case shown in FIG. 17.

Then, it is necessary to assume a case in which the principal point 10 of the objective lens 2 is located at the higher position more or less, though the center of gravity 9 of the bobbin 5 coincides almost with the height H of the anchoring section 8a of the suspension 8. When the tracking servo is applied to the objective lens 2 in this state, the bobbin 5 moves linearly in the radial direction of the optical disk D (which corresponds to the tracking direction TRK) and does not tilt as shown in FIG. 18, so that the tracking servo operation will not affect the radial skew servo operation at all.

Figure 19:
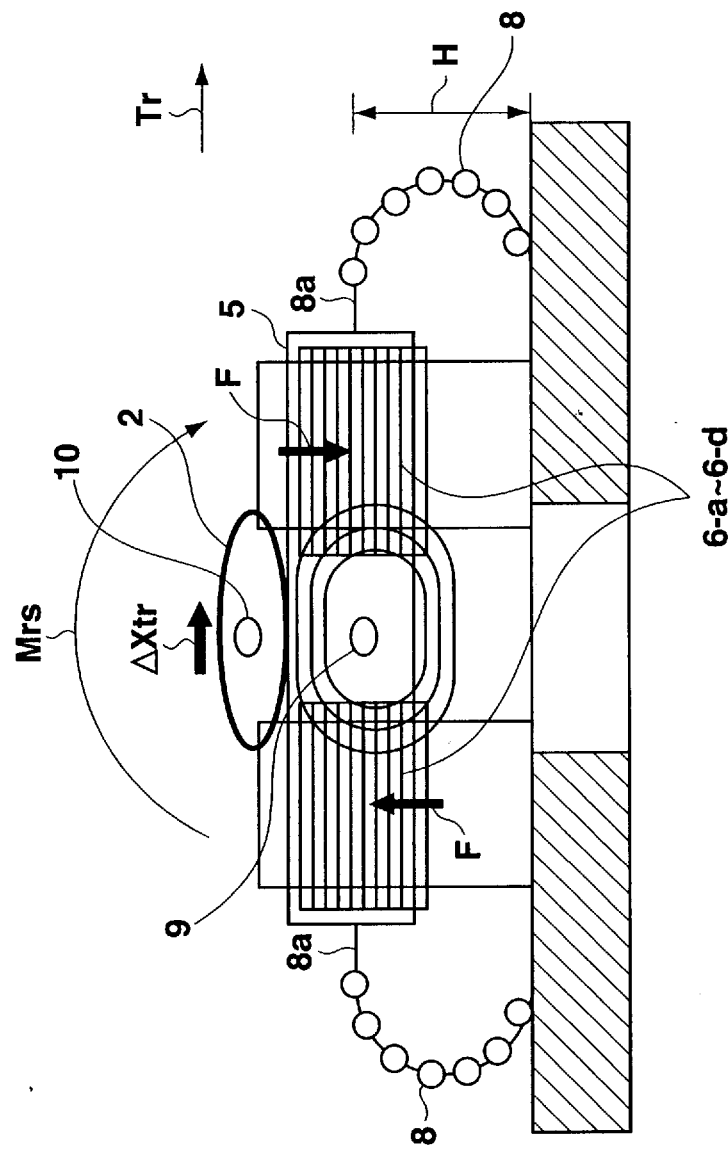
FIG. 19 is a diagram showing an example of operation of radial skew servo in the case shown in FIG. 17.

When the radial skew servo is applied to the objective lens 2 on the other hand, the objective lens 2 turns centering on the center of gravity 9 of the bobbin 5, so that a momental force Mrs acts and moves the position of the principal point 10 of the objective lens 2 in the tracking direction TRK by a distance ΔXtr as shown in FIG. 19. Therefore, the radial skew servo operation turns out to be disturbance to the tracking servo operation.

Figure 20:
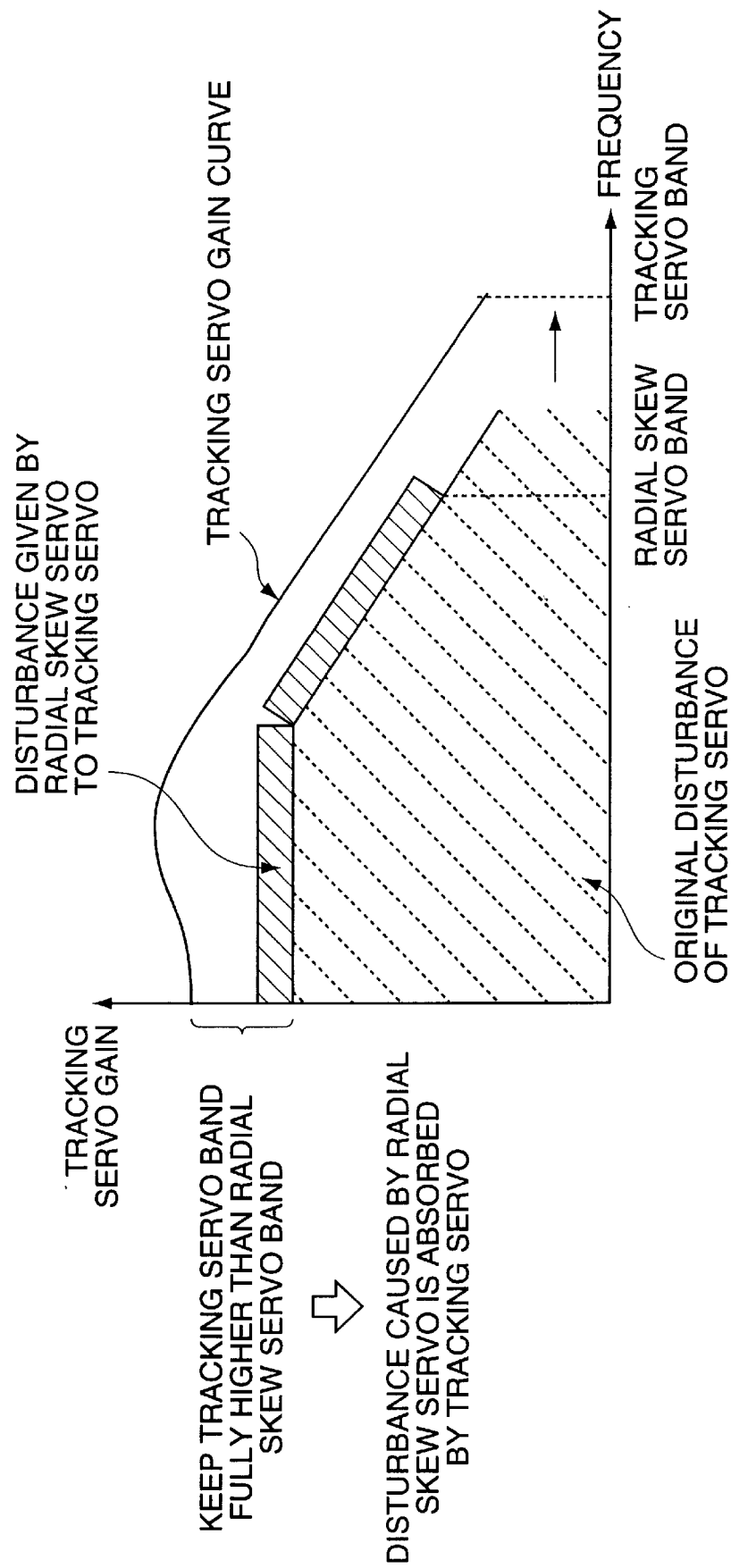
FIG. 20 is a diagram showing a state in which disturbance which the radial skew servo gives to the tracking servo is contained in a tracking servo gain curve.

However, the disturbance given to the tracking servo by the radial skew servo falls within a gain curve of the tracking servo and may be absorbed by setting the band of the tracking servo at a frequency fully higher than the band of the radial skew servo as shown in FIG. 20.

Figure 21:
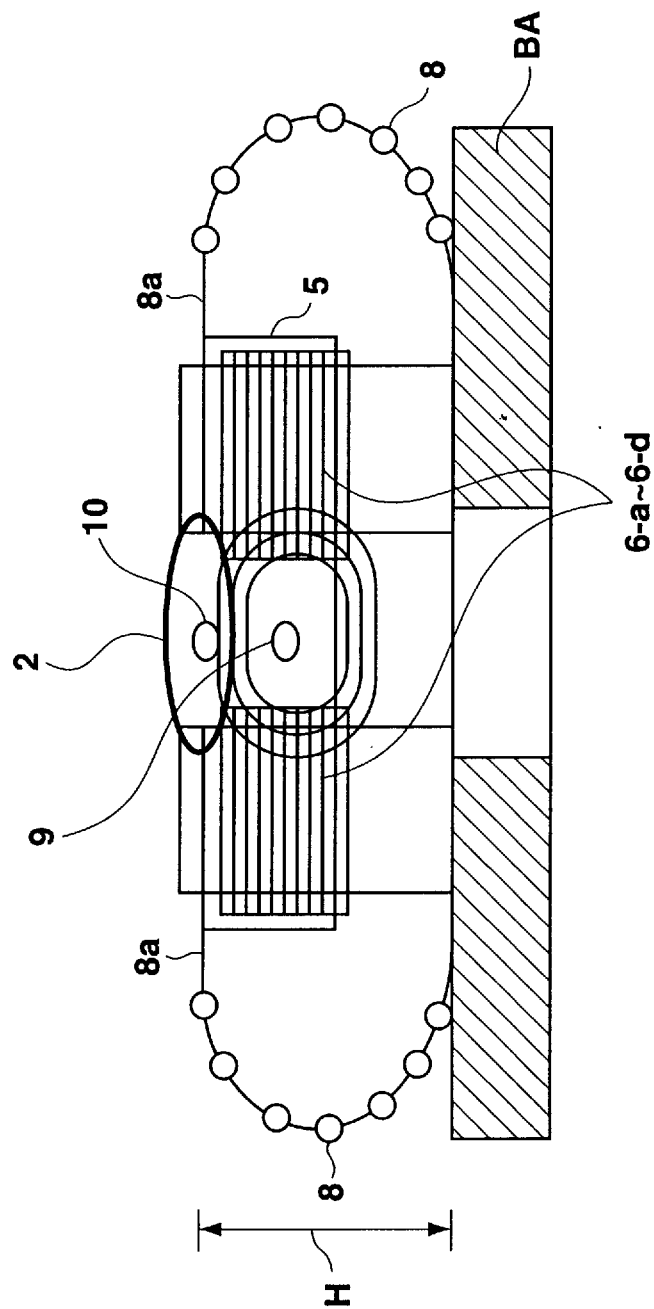
FIG. 21 is a diagram showing a case in which although the principal point of the objective lens coincides almost with the suspension anchoring height, the center of gravity of the bobbin is located at the position lower than them.

FIG. 21 shows a still other embodiment in which the height H of the anchoring section 8a of the suspension 8 coincides almost with the height of the principal point 10 of the objective lens 2. However, the height of the center of gravity 9 of the bobbin 5 is located at the position lower than the principal point 10 of the objective lens 2 and the height of the anchoring section 8a of the suspension 8.

Figure 22:
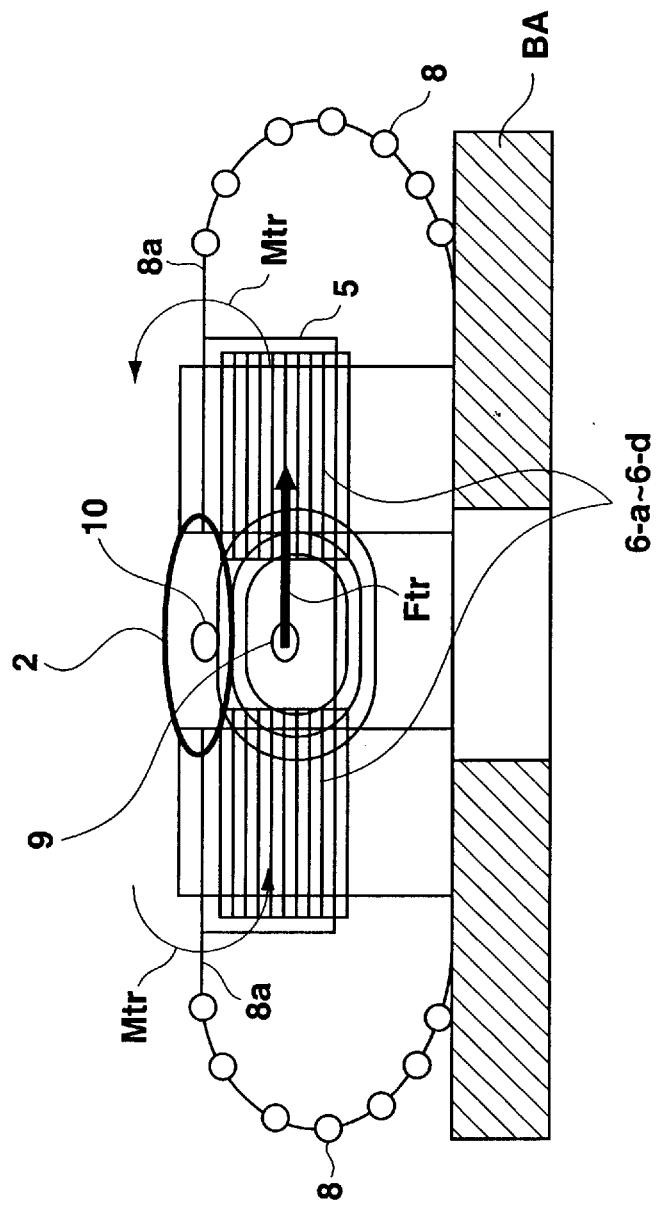
FIG. 22 is a diagram showing a state when the tracking servo operation is carried out at a frequency lower than a primary resonance frequency ft in the state shown in FIG. 21.

Considering a primary resonance frequency in the tracking direction TRK as ft, the bobbin 5 and the objective lens 2 are involved with the rotational motion Mtr during the tracking operation in a frequency f lower than the primary resonance frequency and the rotational motion affects a radial skew servo force Ftr as shown in FIG. 22 in such embodiment. However, the radial skew operation will not affect the tracking servo.

Figure 23:
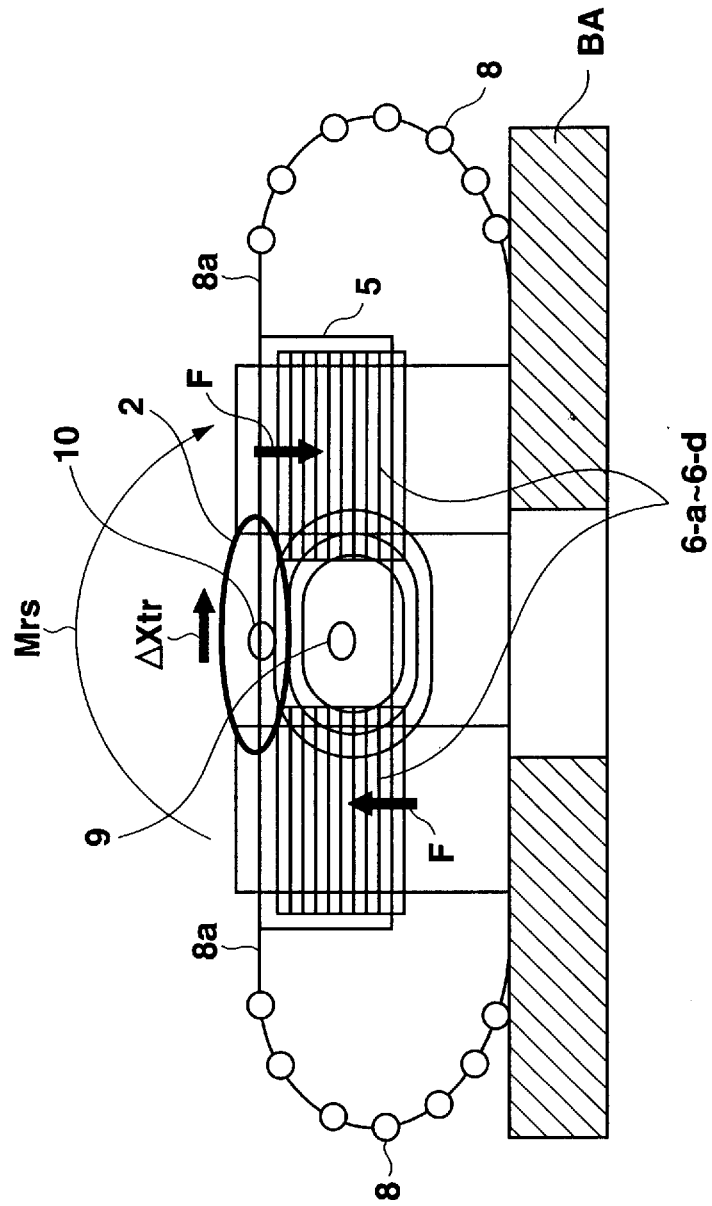
FIG. 23 is a diagram showing a state when the radial skew servo operation is carried out at a frequency higher than the primary resonance frequency ft.

In a frequency higher than the primary resonance frequency ft in the tracking direction on the other hand, although the tracking operation involves only the linear motion of the bobbin 5 and the objective lens 2 and gives no influence on the radial skew servo as shown in FIG. 23, the position of the principal point 10 of the objective lens 2 moves in the tracking direction by the distance ΔXtr during the radial skew servo operation.

Figure 24:
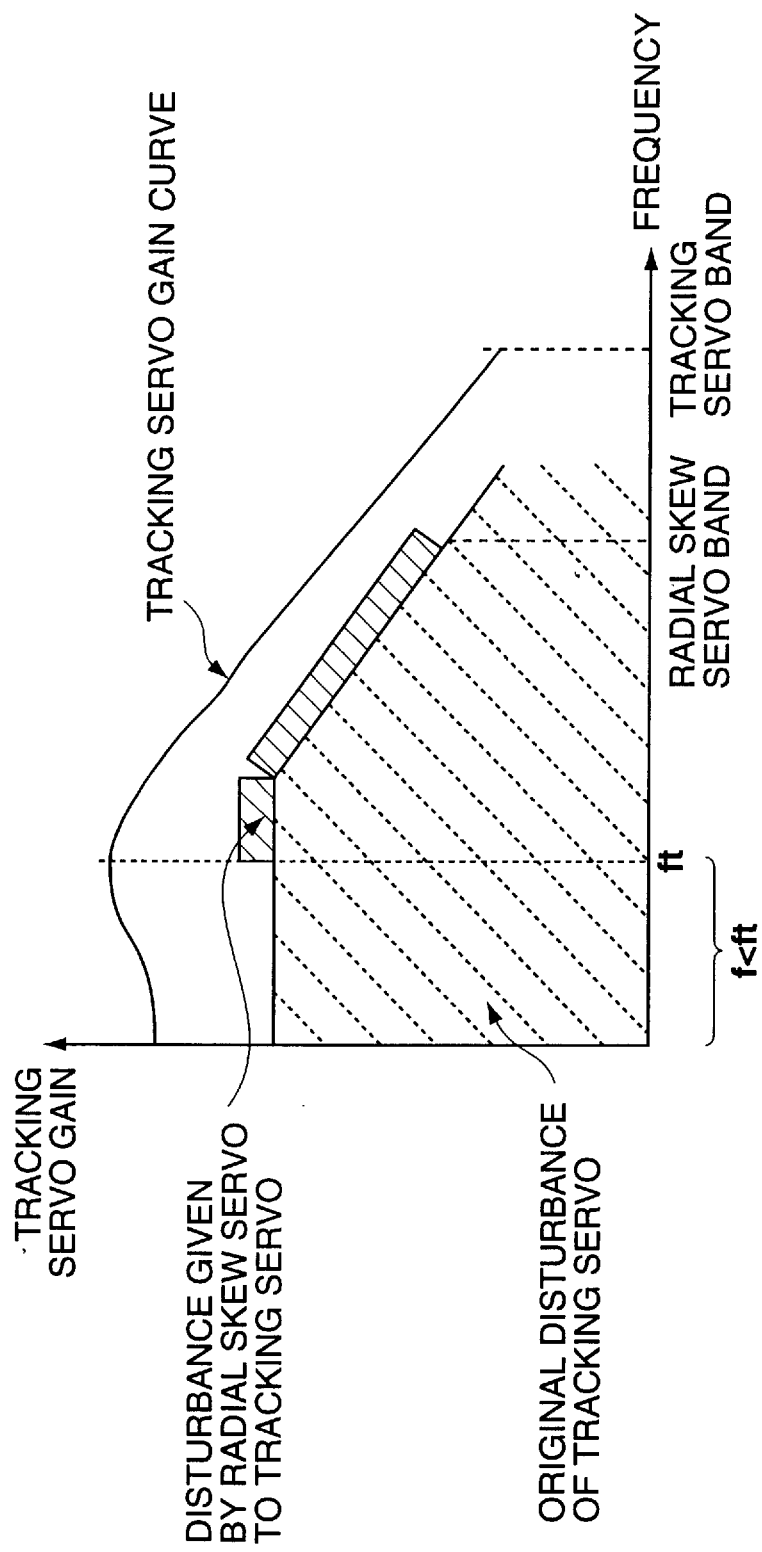
FIG. 24 is a graph showing a tracking servo gain curve having a frequency fully higher than the disturbance given by the radial skew servo to the tracking servo.
Figure 25:
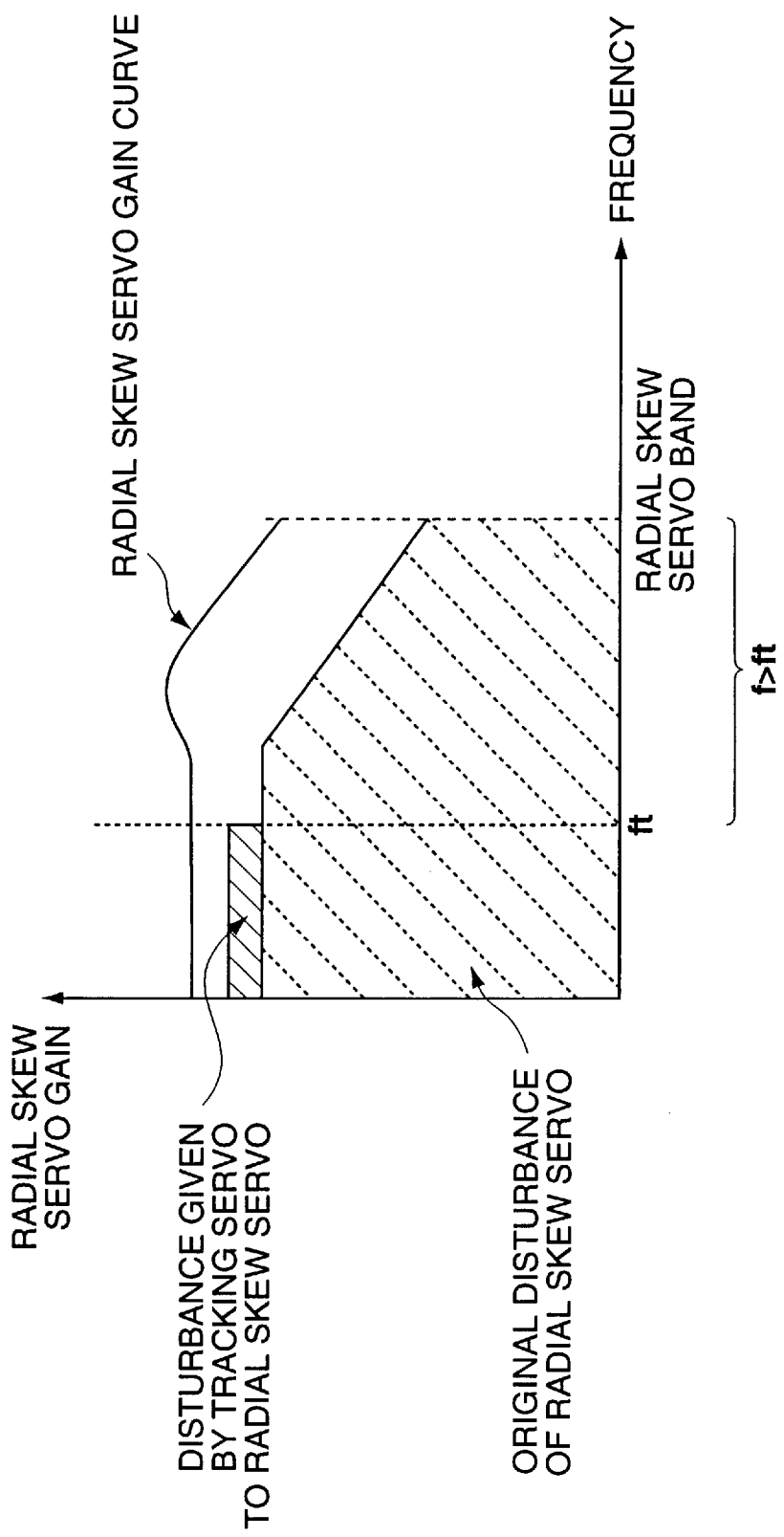
FIG. 25 is a graph showing a radial skew servo gain curve having a frequency fully higher than the disturbance given by the tracking servo to the radial skew servo.
Figure 29:
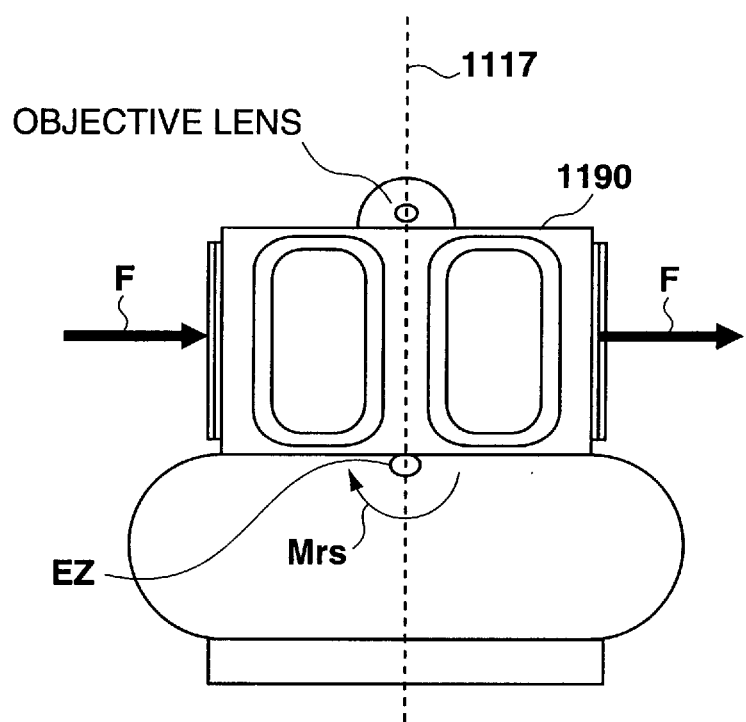
FIG. 29 is a diagram showing a tracking servo operation in the prior art example shown in FIG. 27.

Although the tracking servo and the radial skew servo give the disturbance each other as shown in FIG. 24 after all, the tracking servo and the radial skew servo may be applied stably by taking a fully high servo gain in each because the band of the tracking servo shown in FIG. 24 differs from the radial skew servo band shown in FIG. 25.

A case in starting the skew servo in a state when the optical axis of the objective lens 2 and the optical disk plane are far from being vertical will be explained below.

The driving circuit 300 comprising the photo-detector 160 splitted into eight detectors in FIG. 5, the tangential skew sensor 3 in FIG. 6, the radial skew sensor 4 in FIG. 7, the focusing coils 6a through 6d and the tracking coils 7a and 7b in FIG. 1 will be explained below with reference to FIG. 30.

Figure 30:
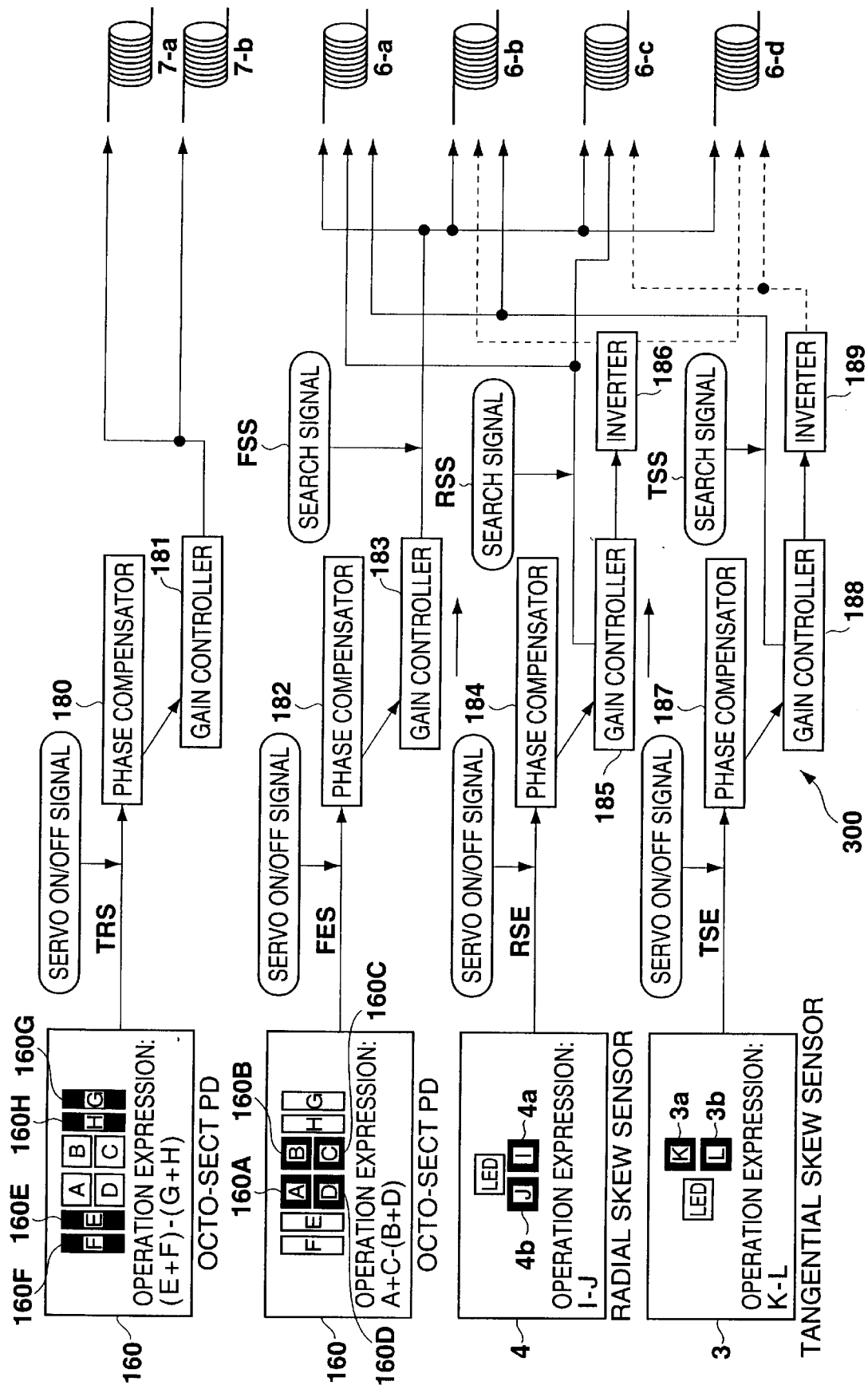
FIG. 30 is a diagram showing an exemplary driving circuit of focusing coils and tracking coils shown in FIGS. 2 and 3 in starting the skew servo in a state in which the optical axis of the objective lens and the plane of the optical disk are far from being vertical.

FIG. 30 shows the connection of the photo-detector 160, the radial skew sensor 4, the tangential skew sensor 3, the four focusing coils 6a through 6d and the two tracking coils 7a and 7b in the driving circuit 300.

In FIG. 30, the photo-detectors 160E through 160H are connected to the two tracking coils 7a and 7b via the phase compensator 180 and the gain controller 181. The photo-detectors 160A through 160D are connected to the four focusing coils 6a through 6d via the phase compensator 182 and the gain controller 183.

The radial skew sensor 4 is connected to the two focusing coils 6b and 6d via the phase compensator 184, the gain controller 185 and the inverter 186. The radial skew sensor 4 is connected also to the two focusing coils 6a and 6c via the phase compensator 184 and the gain controller 185.

The tangential skew sensor 3 is connected to the two focusing coils 6c and 6d via the phase compensator 187, the gain controller 188 and the inverter 189. The tangential skew sensor 3 is connected also to the two focusing coils 6a and 6b via the phase compensator 187 and the gain controller 188.

In the reproducing optical system 150 shown in FIG. 1, the photo-detectors 160A through 160H receive the return light from the disk plane DP. The phase of a focusing error signal FES sent from the detectors 160A through 160D in FIG. 30 is compensated by the phase compensator 182 and its gain is controlled by the gain controller 183. Then, a driving current having the same phase is sent to the four focusing coils 6a through 6d. In applying the focusing servo, the lead-in of the servo is stabilized by feeding a focus search current to the focusing coils 6a through 6d instead of the driving current whose gain has been controlled.

The detectors 160E through 160H in FIG. 30 send a tracking error signal TRS to the phase compensator 180 based on a servo-on signal. The tracking error signal TRS is phase-compensated by the phase compensator 180 and its gain is controlled by the gain controller 181. Then, a driving current having the same phase is sent to the two tracking coils 7a and 7b from the gain controller 181.

A radial skew error signal RSE obtained from the radial skew sensor 4 in FIG. 30 is sent to the phase compensator 184 to be phase-compensated based on the servo-on signal and its gain is controlled by the gain controller 185. Then, a driving current having the same phase is sent from the gain controller 185 to the two focusing coils 6a and 6c and a driving current having an opposite phase is sent to the remaining two focusing coils 6b and 6d. In this case, the gain-controlled driving current may be searched by a search signal RSS.

A tangential skew error signal TSE obtained from the tangential skew sensor 3 in FIG. 30 is phase-compensated by the phase compensator 187 and its gain is controlled by the gain controller 188. Then, a driving current having the same phase is sent from the gain controller 188 to the two focusing coils 6a and 6b and a driving current having an opposite phase is sent to the remaining two focusing coils 6c and 6d. In this case, the driving current having the same phase may be searched by a search signal TSS.

Exemplary operations of the apparatus for driving the objective lens described above will be explained below with reference to FIGS. 31 and 32. FIGS. 31A through 31C show the manner how put into the state shown in FIG. 31C via the state shown in FIG. 31B when the skew servo is OFF and the data plane of the optical disk D and the objective lens 2 are far from an ideal relative angle, i.e. when the data plane of the optical disk D is not vertical to the optical axis OPL of the objective lens 2 (see FIG. 3). FIG. 31C shows a state in which the data plane of the optical disk D is vertical to the optical axis of the objective lens 2.

Figure 32:
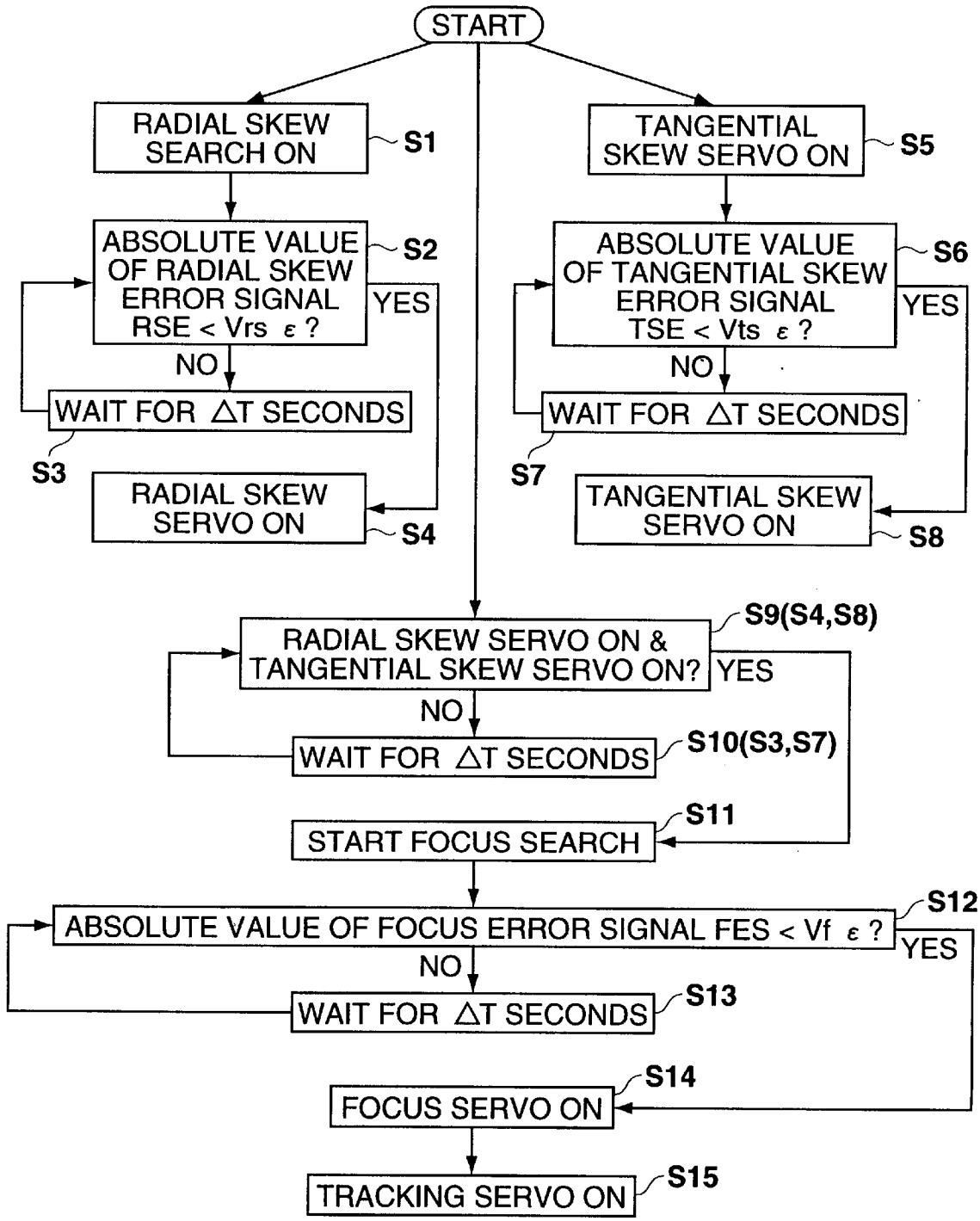
FIG. 32 is a flowchart showing an exemplary operation of the radial skew servo and tangential skew servo shown in FIG. 31 and of the focusing servo and tracking servo thereafter.

Specifically, FIGS. 31A through 31C represent Steps 1 through 4 in a flowchart in FIG. 32.

Seeing FIG. 31A and Step 1 in FIG. 32 at first, it can be seen that the data plane (disk plane DP shown in FIG. 1) of the optical disk D is not vertical to the optical axis of the objective lens 2 and the radial skew error signal Ers represents a large value in correspondence to an angle θ. The radial skew search is then started in this state based on the search signal RSS in FIG. 30 (Step 1) and the radial skew servo is turned on as indicated in Step 4 when the absolute value of the radial skew error signal RSE (gain controlled) becomes less than a threshold value Vrs ε which is a preset level set in advance (Step 2).

When the radial skew error signal RSE is equal or greater than the set level on the other hand, the process waits for ΔT seconds as indicated in Step 3 until the radial skew error signal RSE becomes smaller than the set level Vrs ε. FIGS. 31B shows this state. Thereby, the optical axis of the objective lens 2 may be set vertical to the data plane of the optical disk D as shown in FIG. 31C.

Further, the tangential skew search shown in FIG. 32 may be started in the same time with or in the different time from the start of the radial skew search (Step 1) in Steps 5 through 8. The tangential skew search is carried out based on the search signal TSS in FIG. 30 and when the absolute value of the tangential skew error signal TSE (gain controlled) is smaller than a preset level value Vts ε (Step 6), the tangential skew servo is turned on as indicated in Step 8. When the absolute value of the tangential skew error signal TSE is equal to or greater than the preset level Vts ε on the other hand, the process waits for ΔT seconds to reduce the absolute value of the tangential skew error signal TSE to be smaller than the preset level Vts ε as indicated in Step 7. Thereby, the radial skew servo operation in the radial skew direction RSD and the tangential skew servo operation in the tangential skew direction TSD shown in FIG. 3 may be completed.

After finishing the radial skew servo operation and the tangential skew servo operation, the focusing servo and the tracking servo are turned on as indicated in Steps 9 through 15 in FIG. 32. That is, when the radial skew servo and the tangential skew servo are turned on as indicated in Step 9, the focus search operation is started as indicated in Step 11. The focusing error signal FES is searched based on the search signal FSS shown in FIG. 30 in this focus search.

When the radial skew servo and the tangential skew servo are thus turned on, the focus search is started in Step 11.

When the absolute value of the focusing error signal FES (gain controlled) in FIG. 30 is smaller than the preset value Vf ε as indicated in Step 12, the focusing servo is turned on and then the tracking servo is turned on as indicated in Steps 14 and 15. When the absolute value of the focusing error signal FES is equal to or greater than the preset level Vf ε on the other hand, the process waits for ΔT seconds in Step 13.

Thus, as for the skew servo, the radial skew servo and the tangential skew servo are turned on, respectively, when the absolute values of the radial skew error signal RSE and the tangential skew error signal TSE become smaller than the preset level by supplying the search signals RSS and TSS shown in FIG. 30. Thereby, the objective lens is tilted as shown in FIGS. 31A through 31C and the optical axis of the objective lens 2 may be set vertical to the data plane of the optical disk D as shown in FIG. 31C.

Because the focusing servo and the tracking servo are turned on after turning on the radial skew servo and the tangential skew servo as indicated in Steps 9 through 15 in FIG. 32, the skew servo will not act as disturbance to the focusing servo and the tracking servo. Further, because the radial skew servo and the tangential skew servo will barely interfere each other, the focusing servo gain and the tracking servo gain will not affect in setting the focusing servo and the tracking servo even if they are high from the beginning.

It is noted that the same effect with Steps 1 through 15 in FIG. 32 may be obtained by carrying out the process in Steps 9 through 15 without carrying out the radial skew search and the tangential skew search, i.e. leaving a certain time after starting the skew servo without monitoring the skew error signal.

Another exemplary example of the apparatus for driving the objective lens will be explained below with reference to FIGS. 33 and 34.

FIG. 33 shows a state in which the data plane of the optical disk D is inclined with respect to the optical axis of the objective lens 2, similarly to that shown in FIG. 31. FIGS. 33A through 33C show changes of states from which the radial skew is large to which the data plane of the optical disk D is vertical to the optical axis of the objective lens 2, i.e. changes from Steps 1 to 5 in FIG. 34.

At first, the gain of the radial skew servo is set at a low level value Drs 1 as indicated in Step 1. That is, the gain is set at the low value in advance so that the focusing and tracking servo will not be undone even when the skew servo is turned on in the state when the radial skew error signal RSE is large.

The radial skew servo is started in Step 2 and when the absolute value of the radial skew error signal RSE is smaller than the preset level Vrs ε in Step 3, the process shifts to Step 5 to change the radial skew servo gain from the low level value Drs 1 to a high level value Grs 2. When the absolute value of the radial skew error signal RSE is equal to or greater than the preset level Vrs ε on the other hand, the process waits for ΔT seconds like Step 4 to reduce the absolute value of the radial skew error signal RSE to be smaller than the preset level Vrs ε. That is, the skew servo gain is changed to the high level value Grs 2 when the absolute value of the radial skew error signal RSE becomes smaller than the threshold value by being searched based on the search signal RSS shown in FIG. 30.

FIGS. 33B and 33C show this state. FIG. 33B shows the low level value (gain) Grs 1 and the point of time when the skew servo gain is to be raised. FIG. 33C shows the state in which the radial skew servo gain shifts from the low level value Grs 1 to the high level value Grs 2.

Figure 34:
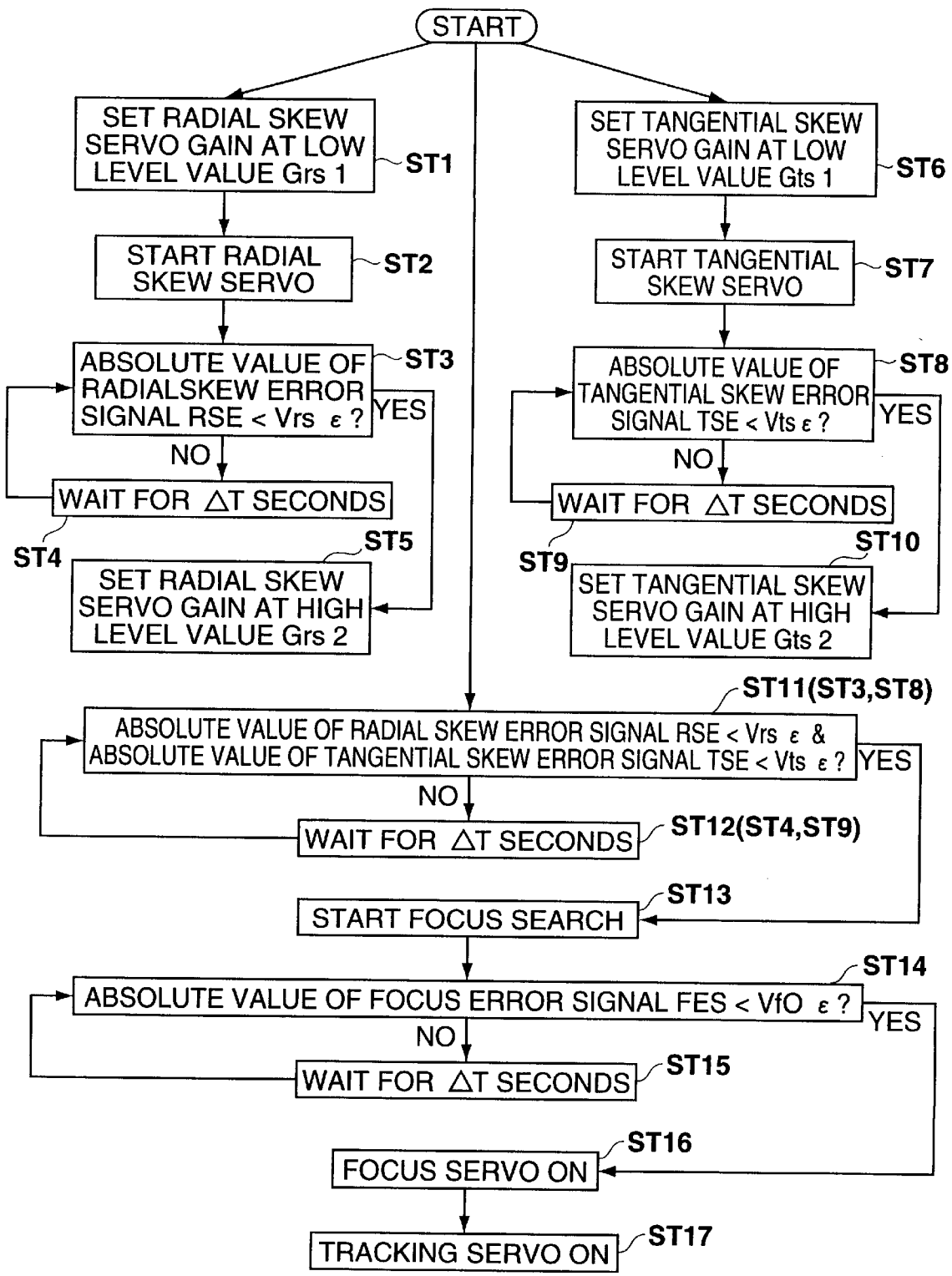
FIG. 34 is a flowchart showing an example for setting the radial skew servo gain and the tangential skew servo gain and the relationship between the focusing servo and the tracking servo thereafter in connection with those shown in FIG. 33.
Figure 36:
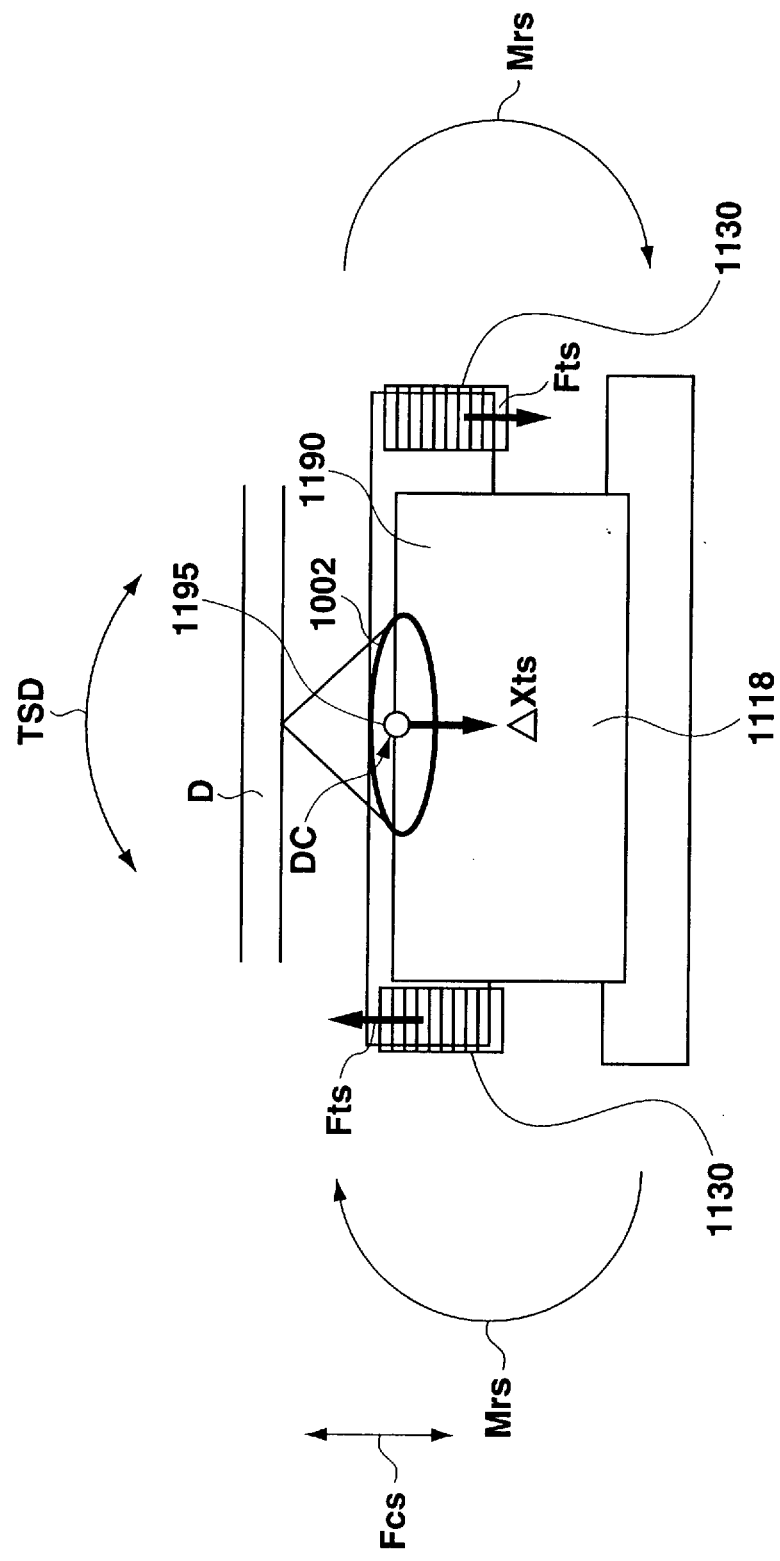
FIG. 36 is a drawing showing an exemplary operation of the prior art example shown in FIG. 27.

Next, the tangential skew servo gain is set at a low level value Gts 1 in the same time or after the radial skew servo gain in Step 6 in FIG. 34 and the tangential skew servo is started in Step 7. The tangential skew servo is a servo carried out along the tangential skew direction TSD shown in FIG. 3. When the absolute value of the tangential skew error signal TSE is smaller than a preset value Vts ε, the process shifts from Step 8 to Step 10 to change the tangential skew servo gain from the low level value Gts 1 to a high level value Gts 2. When the absolute value of the tangential skew error signal TSE is equal to or greater than the preset level Vts ε on the other hand, the process waits for ΔT seconds like Step 9 to reduce the absolute value of the tangential skew error signal TSE to be smaller than the preset level Vts ε.

When the absolute value of the radial skew error signal RSE is smaller than the preset level Vrs ε and the absolute value of the tangential skew error signal TSE is smaller than the preset level Vts ε, the process is shifted from Step 11 to Step 13 to start the focus search operation. When it is not the case, the process waits for ΔT seconds like Step 12 to reduce the absolute value of the radial skew error signal RSE to be smaller than the preset level Vrs ε and to reduce the absolute value of the tangential skew error signal TSE to be smaller than the preset level Vts ε.

When the focus search is started in Step 13 and the absolute value of the focusing error signal FES is smaller than the preset level Vfo ε, the process is shifted to Step 16 to turn on the focusing servo and to turn on the tracking servo in Step 17. When the absolute value of the focusing error signal FES is greater than or equal to the preset level Vfo ε on the other hand, the process waits for ΔT seconds like Step 15 to reduce the absolute value of the focusing error signal FES to be smaller than the preset level Vfo ε.

Thus, the radial skew servo gain and the tangential skew servo gain are set at the level of the values Grs 1 and Gts 1 which are lower than what the apparatus for driving the objective lens requires in the beginning as indicated in Steps 1 and 6. Then, the skew error signals are monitored and when the values thereof become smaller than the preset levels Vrs ε and Vts ε which are preset threshold values, the skew servo gains are raised to the preset levels Grs 2 and Gts 2 which are fully higher than the values which the apparatus for driving the objective lens is requiring.

Thereby, the optical axis of the objective lens 2 may be set vertical to the data plane of the optical disk D with respect to the radial skew direction and the tangential skew direction as shown in FIG. 33C.

Further, the focus search is carried out when the absolute value of the radial skew error signal RSE becomes smaller than the preset level Vrs ε and the absolute value of the tangential skew error signal TSE becomes smaller than the preset level Vts ε to turn on the focusing servo and the tracking servo when the focusing error signal FES is smaller than the preset level Vfo ε as shown in Steps 11 through 17 in FIG. 34, so that the focusing servo and the tracking servo may be lead in stably even when the servo gain of the focusing servo and the tracking servo is fully high.

It is noted that a certain level of effect may be obtained by starting the focusing and tracking servos after raising the skew servo gain from the low level to the high level by leaving a certain time after starting the skew servo without monitoring the skew error signal, differing from the flow of the operation shown in FIG. 34.

As described above, according to the present invention, the apparatus for driving the objective lens allows the skew servo, focusing servo and tracking servo to be lead in stably, i.e. to be executed, without causing the skew servo to affect the focusing servo and tracking servo in correcting, optically, the deviation from the adequate angle between the optical axis of the optical pickup and the optical disk caused by the subtle precision of the mechanism, the warpage of the optical disk and the like in the state in which the data plane of the optical disk and the objective lens are far from the ideal relative angle in the optical disk system for recording/ reproducing data to/from the optical disk by using convergent laser light.

The present invention allows the skew of the optical disk to be corrected and the skew servo to be incorporated stably by tilting (by carrying out the skew servo) such that the optical axis of the objective lens is always vertical to the data plane of the optical disk while implementing the focusing and tracking servo control of the objective lens.

By the way, the present invention is not confined only to the embodiments described above. That is, although the cases in which data recorded in the data plane of the optical disk is reproduced have been explained in the embodiments, the inventive apparatus for driving the objective lens may be applied also to a recording/ reproducing type optical disk system which can record/reproduce data to/from an optical disk.

While the preferred embodiments have been explained, variations thereto will occur to those skilled in the art within the scope of the present inventive concepts which are delineated by the following claims.

What is claimed is:

1. An apparatus for driving an objective lens of an optical disk system for recording/reproducing data to/from a data plane of an optical disk by using light, comprising:

an objective lens movable part having formed thereon an objective lens and skew sensing means, said skew sensing means for detecting radial and tangential skew with respect to a relative angle between said objective lens and a data plane of said optical disk;

first driving means for permitting objective lens movable part to move in a focusing direction and in a radial skew direction/tangential skew direction;

second driving means for permitting said objective lens movable part to move in a tracking direction by crossing tracks of said optical disk;

a fixing section; and suspensions for elastically holding said objective lens movable part with respect to said fixing section.

2. The apparatus for driving the objective lens of the optical disk system according to claim 1, wherein a center of gravity of said objective lens movable part is located on an optical axis of said objective lens and the height for anchoring said suspensions to said objective lens movable part is coincident almost with the height of said center of gravity of said objective lens.

3. The apparatus for driving the objective lens of the optical disk system according to claim 2, wherein a servo band in causing said second driving means to perform a tracking servo operation is set at a frequency higher than a servo band in causing said first driving means to perform a radial skew servo operation.

4. The apparatus for driving the objective lens of the optical disk system according to claim 1, wherein a center of gravity of said objective lens movable part is located on an optical axis of said objective lens, said objective lens being located above said center of gravity and the height for anchoring said suspensions to said objective lens movable part is coincident almost with the height of a rear side principal point of said objective lens.

5. The apparatus for driving the objective lens of the optical disk system according to claim 1, wherein a center of gravity of said objective lens movable part is located on an optical axis of objective lens, said center of gravity of said objective lens movable part being coincident with a rear side principal point of said objective lens and the height for anchoring said suspensions to said objective lens movable part is coincident almost with the height of said center of gravity of said objective lens movable part and the height of the rear side principal point of said objective lens.

6. The apparatus for driving the objective lens of the optical disk system according to claim 1, wherein said skew sensing means comprises radial and tangential skew sensors for detecting a relative inclination between said optical disk and said objective lens;

each of said skew sensors comprising:
light emitting means for emitting light having a different wavelength from a wavelength of light used in a reading optical system for reading signals on the data plane of said optical disk;
an optical filter for transmitting the light emitted by said light emitting means and for blocking the light used in said reading optical system; and
light receiving means for receiving the light emitted from said light emitting means and reflected on the data plane of said optical disk.

7. The apparatus for driving the objective lens of the optical disk system according to claim 6, wherein said light receiving means comprises two photodetectors placed in tandem.

8. The apparatus for driving the objective lens of the optical disk system according to claim 1, wherein said suspension is a plate-like member with a plurality of rib-like portions having increased thickness along the track direction of said optical disk, wherein said plate-like member is bent in a U-shape to provide elasticity.

9. The apparatus for driving the objective lens of the optical disk system according to claim 8, wherein said objective lens movable part is rectangular in shape and a plurality of said suspensions are placed near each corner of said objective lens movable part.

10. The apparatus for driving the objective lens of the optical disk system according to claim 9, wherein said plurality of suspensions are placed symmetrically about an optical axis of said objective lens.

11. The apparatus for driving the objective lens of the optical disk system according to claim 1, further comprising restricting members for restricting said objective lens movable part from shifting excessively in the focusing direction/ tracking direction.

12. The apparatus for driving the objective lens of the optical disk system according to claim 1, said first driving means comprising a plurality of first driving actuators for moving said objective lens linearly in the focusing direction for tilting it at least either in the radial skew direction or the tangential skew direction in correspondence to a degree of skew which is the relative angle between the objective lens and the data plane of said optical disk, and said second driving means comprising a plurality of second driving actuators for moving said objective lens movable part in the tracking direction by crossing tracks of said optical disk.

13. The apparatus for driving the objective lens of the optical disk system according to claim 12, wherein said objective lens movable part is rectangular in shape, said plurality of first driving actuators are located at each corner of said objective lens movable part, and said plurality of second driving actuators are located on each longitudinal ends of said objective lens movable part.

14. The apparatus for driving the objective lens of the optical disk system according to claim 13, wherein said first and second driving actuators are placed symmetrically about an optical axis of said objective lens.

15. The apparatus for driving the objective lens of the optical disk system according to claim 12 further comprising a plurality of magnets placed on each longitudinal ends of said objective lens movable part, wherein all of said plurality of magnets are polarized in the track direction of said optical disk and the adjoining magnets are polarized in opposite direction from each other.

16. The apparatus for driving the objective lens of the optical disk system according to claim 1, wherein a skew servo is started by tilting said objective lens with respect to said data plane of said optical disk to adjust the skew when a current is supplied to said first driving means and a value of a skew error signal output from said skew sensing means becomes smaller than a preset level.

17. The apparatus for driving the objective lens of the optical disk system according to claim 16, wherein a focusing servo operation and a tangential skew operation are started after starting a skew servo operation.

18. The apparatus for driving the objective lens of the optical disk system according to claim 1, wherein a servo gain of a skew servo is variable and the skew servo gain is set at a preset gain level within a certain time from a point of time when a value of a skew error signal output from said skew sensing means becomes smaller than the preset level after starting the skew servo or the skew servo gain is set at a preset gain level within a certain time right after starting the skew servo.

19. The apparatus for driving the objective lens of the optical disk system according to claim 18, wherein a focusing servo operation and a tangential skew operation are started after starting a skew servo operation.

20. An apparatus for driving an objective lens of an optical disk system for recording/reproducing data to/from a data plane of an optical disk by using light, comprising:

an objective lens movable part having formed thereon an objective lens and skew sensing means for detecting skew with respect to a relative angle between said objective lens and a data plane of said optical disk;

first driving means for permitting objective lens movable part to move in a focusing direction and in a radial skew direction/tangential skew direction;

second driving means for permitting said objective lens movable part to move in a tracking direction by crossing tracks of said optical disk;

a fixing section; and suspensions for elastically holding said objective lens movable part with respect to said fixing section, wherein said suspension is a plate-like member with a plurality of rib-like portions having increased thickness along the track direction of said optical disk, wherein said plate-like member is bent in a U-shape to provide elasticity.

* * * * *